US011345780B2

(12) United States Patent
Okunaga et al.

(10) Patent No.: US 11,345,780 B2
(45) Date of Patent: May 31, 2022

(54) THERMOPLASTIC POLYESTER RESIN COMPOSITION AND MOLDED ARTICLE

(71) Applicant: Toray Industries, Inc., Tokyo (JP)

(72) Inventors: Kenichi Okunaga, Nagoya (JP); Yusuke Tojo, Nagoya (JP); Makito Yokoe, Nagoya (JP); Hideyuki Umetsu, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 290 days.

(21) Appl. No.: 16/608,463

(22) PCT Filed: Jun. 20, 2018

(86) PCT No.: PCT/JP2018/023459
§ 371 (c)(1),
(2) Date: Oct. 25, 2019

(87) PCT Pub. No.: WO2019/004022
PCT Pub. Date: Jan. 3, 2019

(65) Prior Publication Data
US 2021/0032402 A1 Feb. 4, 2021

(30) Foreign Application Priority Data

Jun. 29, 2017 (JP) .............................. JP2017-126973
Nov. 30, 2017 (JP) .............................. JP2017-230025

(51) Int. Cl.
C08L 67/02 (2006.01)
C08L 67/00 (2006.01)
C08G 63/183 (2006.01)
C08G 59/24 (2006.01)
C08G 59/32 (2006.01)
C08G 63/189 (2006.01)
C08K 3/32 (2006.01)
C08K 5/49 (2006.01)
C08K 7/14 (2006.01)
C08K 9/04 (2006.01)
C08L 63/04 (2006.01)
C08L 101/06 (2006.01)

(52) U.S. Cl.
CPC ......... C08G 63/183 (2013.01); C08G 59/245 (2013.01); C08G 59/32 (2013.01); C08G 63/189 (2013.01); C08K 3/32 (2013.01); C08K 5/49 (2013.01); C08K 7/14 (2013.01); C08K 9/04 (2013.01); C08L 63/04 (2013.01); C08L 67/02 (2013.01); C08L 101/06 (2013.01); C08K 2003/324 (2013.01); C08L 2201/08 (2013.01); C08L 2203/30 (2013.01); C08L 2205/03 (2013.01)

(58) Field of Classification Search
None
See application file for complete search history.

(56) References Cited

U.S. PATENT DOCUMENTS

| | | | |
|---|---|---|---|
| 3,962,174 A * | 6/1976 | Berardinelli | C08K 3/013 524/408 |
| 4,022,752 A | 5/1977 | Horn et al. | |
| 2003/0207035 A1 | 11/2003 | Schmid et al. | |
| 2009/0208720 A1 | 8/2009 | Miyamoto et al. | |
| 2010/0028580 A1 | 2/2010 | Palmer et al. | |
| 2016/0289445 A1* | 10/2016 | Tojo | C08G 59/688 |
| 2019/0055398 A1 | 2/2019 | Tojo et al. | |
| 2019/0062547 A1 | 2/2019 | Tojo et al. | |

FOREIGN PATENT DOCUMENTS

| | | | |
|---|---|---|---|
| EP | 3072928 A1 | 9/2016 | |
| JP | 50-151953 | 12/1975 | |
| JP | S59-179556 A | 10/1984 | |
| JP | 01-156362 | 6/1989 | |
| JP | 05-043767 | 2/1993 | |
| JP | 4-39352 | 2/1995 | |
| JP | 7-145303 | 6/1995 | |
| JP | H08-245865 A | 9/1996 | |
| JP | 2000154307 A * | 6/2000 | ............. C08L 67/02 |
| JP | 2000-511575 | 9/2000 | |
| JP | 2006-124538 | 5/2006 | |
| JP | 2009-155478 A | 7/2009 | |
| JP | 2010-159431 | 7/2010 | |
| JP | 2011-529991 | 12/2011 | |
| JP | 2015-108134 | 6/2015 | |
| WO | WO-0121702 A1 * | 3/2001 | ............... C08K 7/02 |
| WO | WO-0121704 A1 * | 3/2001 | ........... C08K 5/3417 |
| WO | 2008/075776 | 6/2008 | |
| WO | WO-2015072216 A1 * | 5/2015 | ......... C08G 59/3218 |
| WO | 2017/135055 | 8/2017 | |

OTHER PUBLICATIONS

Machine translation of JP-2000154307-A (no date).*
The Extended European Search Report dated Mar. 3, 2021, of counterpart European Application No. 18825144.1.

* cited by examiner

Primary Examiner — Michael J Feely
(74) Attorney, Agent, or Firm — DLA Piper LLP (US)

(57) ABSTRACT

A thermoplastic polyester resin composition includes a thermoplastic polyester resin (A), an epoxy compound (B) having an epoxy equivalent of from 200 to 3,000 g/eq, and a hydroxy group-containing resin (C) having a number average molecular weight of from 2,000 to 500,000 and a halogen element content of 1,000 ppm or less, wherein the epoxy compound (B) is blended in an amount of from 0.05 to 10 parts by weight with respect to 100 parts by weight in total of 70 to 99.9 parts by weight of the thermoplastic polyester resin (A) and 0.1 to 30 parts by weight of the hydroxy group-containing resin (C). The thermoplastic resin composition and a molded article achieve both long-term hydrolysis resistance and heat aging resistance at a high level, and can further suppress bleed-out to the surface of the molded article during heat-dry and heat-moisture treatments.

11 Claims, No Drawings

THERMOPLASTIC POLYESTER RESIN COMPOSITION AND MOLDED ARTICLE

TECHNICAL FIELD

This disclosure relates to a thermoplastic polyester resin composition and a molded article obtained by molding the same.

BACKGROUND

Thermoplastic polyester resins have been used in a wide range of fields, for example, in mechanical machine parts, electric/electronic components and automotive parts, utilizing their excellent injection moldability, mechanical properties and other features. However, the thermoplastic polyester resins tend to have reduced mechanical strength due to thermal oxidative degradation at a high temperature. Therefore, to use the thermoplastic polyester resins as industrial materials such as materials for mechanical machine parts, electric and electronic components and automotive parts, the resins are required to have a long-term heat aging resistance at a high temperature, in addition to having balanced general chemical and physical properties. Moreover, the thermoplastic polyester resins are susceptible to degradation by hydrolysis. Therefore, to use the thermoplastic polyester resins for use in the above-described applications, the resins are also required to have a long-term hydrolysis resistance.

To improve the thermal stability of a thermoplastic polyester resin, for example, a thermoplastic resin composition obtained by adding a compound having isocyanate and/or carbodiimide to a polybutylene terephthalate resin (see, for example, JP 50-151953 A) and a thermoplastic resin composition obtained by adding a polyol, a reinforcing agent and a polymer reinforcing agent to a thermoplastic resin selected from the group consisting of polyamide, polyester and a mixture thereof (for example, see JP 2011-529991 A) have been proposed.

Furthermore, a thermoplastic resin composition obtained by adding a hydroxyl group-containing resin and/or an epoxy compound to a polyester resin has been proposed (see, for example, JP 5-43767 A, JP 1-156362 A, JP 2006-124538 A, JP 2010-159431 A, and JP 2000-511575 A).

However, the methods disclosed in JP 50-151953 A and JP 2011-529991 A have resulted in insufficient heat aging resistance and mechanical properties. There has also been a problem of insufficient effect due to bleed-out of the added polyol, resulting in a reduced content of the hydroxyl group-containing compound in the molded article.

The resin compositions disclosed in JP 5-43767 A, JP 1-156362 A, JP 2006-124538 A, JP 2010-159431 A, and JP 2000-511575 A show improved thermal properties and mechanical strength by containing a hydroxyl group-containing resin, but the resin compositions have not been considered to be sufficient to meet recent demands for materials.

In any of the techniques disclosed in JP 50-151953 A, JP 2011-529991 A, JP 5-43767 A, JP 1-156362 A, JP 2006-124538 A, JP 2010-159431 A, and JP 2000-511575 A, it has been difficult to achieve both the heat aging resistance and the hydrolysis resistance at a high level. It could therefore be helpful to provide a thermoplastic resin composition and a molded article which achieve both long-term hydrolysis resistance and heat aging resistance at a high level while maintaining excellent mechanical properties, and which can be used for applications in a temperature environment that has not been possible with conventional polyester resin compositions, and furthermore, a thermoplastic resin composition and a molded article that can suppress the bleed-out to the surface of the molded article during heat-dry and heat-moisture treatments.

SUMMARY

We found that a thermoplastic polyester resin composition that achieves both heat aging resistance and hydrolysis resistance at a high level.

We thus provide:

[1] A thermoplastic polyester resin composition comprising a thermoplastic polyester resin (A), an epoxy compound (B) having an epoxy equivalent of from 200 to 3,000 g/eq, and a hydroxy group-containing resin (C) having a number average molecular weight of 2,000 to 500,000 and a halogen element content of 1,000 ppm or less, wherein the epoxy compound (B) is blended in an amount of 0.05 to 10 parts by weight with respect to 100 parts by weight in total of 70 to 99.9 parts by weight of the thermoplastic polyester resin (A) and 0.1 to 30 parts by weight of the hydroxy group-containing resin (C).

[2] A molded article obtained by melt-molding the above-mentioned thermoplastic polyester resin composition.

A thermoplastic resin composition and a molded article that achieves both long-term hydrolysis resistance and heat aging resistance at a high level while maintaining excellent mechanical properties, and that can also suppress the bleed-out to the surface of the molded article during heat-dry and heat-moisture treatments can be obtained.

DETAILED DESCRIPTION

The thermoplastic polyester resin composition will be described in detail.

The thermoplastic polyester resin composition (hereinafter sometimes "polyester resin composition") is a thermoplastic polyester resin composition comprising a thermoplastic polyester resin (A), an epoxy compound (B) having an epoxy equivalent of 200 to 3,000 g/eq, and a hydroxy group-containing resin (C) having a number average molecular weight of 2,000 to 500,000 and a halogen element content of 1,000 ppm or less, wherein the epoxy compound (B) is blended in an amount of 0.05 to 10 parts by weight with respect to 100 parts by weight in total of 70 to 99.9 parts by weight of the thermoplastic polyester resin (A) and 0.1 to 30 parts by weight of the hydroxy group-containing resin (C).

There exists a circumstance that the identification of the structure is not practical; the thermoplastic polyester resin composition comprises a reaction product from the reaction of the component (A), the component (B) and the component (C), and this reaction product is produced by a complicated reaction. Therefore, the composition is identified by the components to be blended.

The thermoplastic polyester resin (A) is a polymer or a copolymer comprising, as main structural units, at least one type of residue selected from the group consisting of (1) a residue of a dicarboxylic acid or an ester-forming derivative thereof and a residue of a diol or an ester-forming derivative thereof, (2) a residue of a hydroxycarboxylic acid or an ester-forming derivative thereof, and (3) a residue of a lactone. As used herein, "comprising as major structural units" means that the resin contains at least one type of residue selected from the group consisting of the above-mentioned (1) to (3) in an amount of 50% by mole or more, preferably in an amount of 80% by mole or more, with respect to the total amount of the structural units. Among these, a polymer or copolymer comprising as main structural units (1) a residue of a dicarboxylic acid or an ester-forming derivative thereof and a residue of a diol or an ester-forming derivative thereof is preferred from the viewpoint of improved mechanical properties and heat resistance.

From the viewpoint of heat resistance, the thermoplastic polyester (A) preferably has a melting point higher than 200° C. When the melting point is higher than 200° C., mechanical properties and durability such as rigidity at a high temperature can be maintained.

Examples of the dicarboxylic acid or ester-forming derivative thereof include: aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-tetrabutylphosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid, and 1,4-cyclohexanedicarboxylic acid; and ester-forming derivatives thereof; and the like. Two or more of these compounds may be used.

Examples of the diol or ester-forming derivative thereof include: aliphatic and alicyclic glycols having 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long chain glycols with a molecular weight of 200 to 100,000 such as polyethylene glycol, poly-1,3-propylene glycol, and polytetramethylene glycol; aromatic dioxy compounds such as 4,4'-dihydroxybiphenyl, hydroquinone, t-butylhydroquinone, bisphenol A, bisphenol S, and bisphenol F; ester-forming derivatives thereof; and the like. Two or more of these compounds may be used.

Examples of the polymer or copolymer comprising as structural units a dicarboxylic acid or an ester-forming derivative thereof and a diol or an ester-forming derivative thereof include: aromatic polyester resins such as polyethylene terephthalate, polypropylene terephthalate, polybutylene terephthalate, polypropylene isophthalate, polybutylene isophthalate, polybutylene naphthalate, polyethylene isophthalate/terephthalate, polybutylene isophthalate/terephthalate, polypropylene terephthalate/naphthalate, polybutylene terephthalate/naphthalate, polybutylene terephthalate/decanedicarboxylate, polypropylene terephthalate/5-sodium sulfoisophthalate, polybutylene terephthalate/5-sodium sulfoisophthalate, polypropylene terephthalate/polyethylene glycol, polybutylene terephthalate/polyethylene glycol, polypropylene terephthalate/polytetramethylene glycol, polybutylene terephthalate/polytetramethylene glycol, polypropylene terephthalate/isophthalate/polytetramethylene glycol, polybutylene terephthalate/isophthalate/polytetramethylene glycol, polybutylene terephthalate/succinate, polypropylene terephthalate/adipate, polybutylene terephthalate/adipate, polypropylene terephthalate/sebacate, polybutylene terephthalate/sebacate, polypropylene terephthalate/isophthalate/adipate, polybutylene terephthalate/isophthalate/succinate, polybutylene terephthalate/isophthalate/adipate, and polybutylene terephthalate/isophthalate/sebacate; and the like. "/" represents a copolymer.

Among these, a polymer or copolymer comprising as main structural units a residue of an aromatic dicarboxylic acid or an ester-forming derivative thereof and a residue of an aliphatic diol or an ester-forming derivative thereof is more preferred from the viewpoint of improving mechanical properties and heat resistance. Still more preferred is a polymer or copolymer comprising as main structural units a residue of a dicarboxylic acid selected from terephthalic acid and naphthalene dicarboxylic acid or an ester-forming derivative thereof, and a residue of an aliphatic diol selected from ethylene glycol, propylene glycol, and 1,4-butanediol or an ester-forming derivative.

Among these, particularly preferred are aromatic polyester resins such as polyethylene terephthalate, polypropylene terephthalate, polybutylene terephthalate, polyethylene isophthalate/terephthalate, polypropylene isophthalate/terephthalate, polybutylene isophthalate/terephthalate, polybutylene terephthalate/decanedicarboxylate, and polybutylene terephthalate/polytetramethylene glycol. Polybutylene terephthalate, polypropylene terephthalate, and polybutylene naphthalate are more preferred, and polybutylene terephthalate is more preferred from the viewpoint of excellent moldability and crystallinity. Two or more of these may be used at an arbitrary content.

The ratio of the amount of terephthalic acid or ester-forming derivative thereof to the total amount of dicarboxylic acid constituting the above-mentioned polymer is preferably 30% by mole or more, and more preferably, 40% by mole or more.

As the thermoplastic polyester resin (A), a liquid crystal polyester resin capable of developing anisotropy during melting can also be used. Examples of the structural unit of the liquid crystal polyester resin include: aromatic oxycarbonyl units, aromatic dioxy units, aromatic and aliphatic dicarbonyl units, alkylenedioxy units, aromatic iminooxy units and the like.

The amount of the carboxyl end groups in the thermoplastic polyester resin (A) is preferably 50 eq/t or less from the viewpoint of flowability, hydrolysis resistance and heat aging resistance. The amount of the carboxyl end groups is more preferably 40 eq/t or less, further preferably 30 eq/t or less. When the amount of the carboxyl end groups exceeds 50 eq/t, under a hot-humid environment and a hot-dry environment of a high temperature, the hydrolysis resistance and heat aging resistance decrease because the carboxy groups act as an acid catalyst. Furthermore, since many carboxy groups react with the epoxy compound (B), the change in the molecular weight of the thermoplastic polyester (A) becomes large, and the retention stability is deteriorated. The lower limit of the amount of the carboxyl end groups is 0 eq/t. The amount of the carboxyl end groups in the thermoplastic polyester resin (A) is the amount determined by dissolving the thermoplastic polyester resin (A) in an o-cresol/chloroform solvent, and then titrating the resulting solution with ethanolic potassium hydroxide.

The thermoplastic polyester resin (A) preferably has a weight average molecular weight (Mw) of 8,000 or more from the viewpoint of further improving mechanical properties. On the other hand, the weight average molecular weight (Mw) of 500,000 or less is preferred because the balance between mechanical properties and molding processability (melt viscosity) is excellent. The weight average molecular weight is more preferably 300,000 or less, and still more preferably, 250,000 or less. The Mw of the thermoplastic polyester resin (A) is a value in terms of polymethyl methacrylate (PMMA), determined by gel permeation chromatography (GPC) using hexafluoroisopropanol as a solvent.

From the viewpoint of moldability, the intrinsic viscosity of the thermoplastic polyester resin (A) is preferably 0.36 to 1.60 dl/g as measured in an o-chlorophenol solution at 25° C., and more preferably 0.50 to 1.50 dl/g.

The blending amount of the thermoplastic polyester resin (A) is 70 to 99.9 parts by weight with respect to 100 parts by weight in total of the thermoplastic polyester resin (A) and the hydroxy group-containing resin (C). In this range, both of the heat aging resistance and the hydrolysis resistance can be achieved at a high level. The blending amount exceeding 99.9 parts by weight results in an insufficient effect of improving the heat aging resistance. The blending amount is more preferably 99.8 parts by weight or less, still more preferably 99.5 parts by weight or less, and particularly preferably 99 parts by weight or less. On the other hand, the blending amount of less than 70 parts by weight is not preferred because the hydrolysis resistance and mechanical properties tend to decrease. The blending amount is more preferably 80 parts by weight or more, and still more preferably, 90 parts by weight or more.

The thermoplastic polyester resin (A) can be produced by a method known in the art such as polycondensation or ring-opening polymerization. The polymerization method may be either batch polymerization or continuous polymerization, and the reaction may be carried out through transesterification or direct polymerization. From the viewpoint of productivity, the continuous polymerization is preferred, and the direct polymerization is preferably used.

When the thermoplastic polyester resin (A) is a polymer or a copolymer obtained by a condensation reaction of a dicarboxylic acid or an ester-forming derivative thereof and a diol or an ester-forming derivative thereof as major components, the polyester resin can be produced by subjecting the dicarboxylic acid or ester-forming derivative thereof and the diol or ester-forming derivative thereof to an esterification reaction or transesterification reaction, followed by a polycondensation reaction.

To efficiently promote the esterification reaction or transesterification reaction and the polycondensation reaction, it is preferred that a polymerization catalyst be added during the reactions. Specific examples of the polymerization catalyst include: organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, and alkylstannonic acids such as methylstannonic acid, ethylstannonic acid, and butylstannonic acid; zirconia compounds such as zirconium tetra-n-butoxide; and antimony compounds such as antimony trioxide and antimony acetate; and the like. Two or more of these compounds may be used.

Among the above-mentioned polymerization catalysts, organic titanium compounds and tin compounds are preferred, and tetra-n-butyl esters of titanic acid are more preferred. The polymerization catalyst is preferably added in an amount of 0.01 to 0.2 parts by weight with respect to 100 parts by weight of the thermoplastic polyester resin.

The thermoplastic polyester resin composition comprises the thermoplastic polyester resin (A), the epoxy compound (B), and the hydroxy group-containing resin (C). In general, the main chain of the thermoplastic polyester resin (A) is decomposed due to thermal oxidative degradation, resulting in a decrease in the molecular weight and an increase in the amount of carboxy end groups. This decrease in the molecular weight due to the thermal oxidative degradation is accompanied by reduced mechanical properties of a molded article composed of the thermoplastic polyester resin composition. Furthermore, in the thermoplastic polyester resin (A), the ester bond of the main chain is cleaved by hydrolysis to generate a carboxy end group and a hydroxy end group. The carboxy end group produced by this hydrolysis is a factor that further accelerates the cleavage of another ester bond, and as a result of the accelerated cleavage of the main chain, the molecular weight decreases, and the mechanical properties of the molded article composed of the thermoplastic polyester resin composition decrease.

When the thermoplastic polyester resin (A), the epoxy compound (B), and the hydroxy group-containing resin (C) are blended, the above-mentioned decomposition reaction can be suppressed, and the hydrolysis resistance and heat aging resistance of the thermoplastic polyester resin composition can be improved.

The epoxy compound (B) has an epoxy equivalent of 200 to 3,000 g/eq. As used herein, the epoxy equivalent (g/eq) of the epoxy compound (B) is a value obtained by dividing the molecular weight per mole of the epoxy compound by the number of epoxy groups per molecule of the epoxy compound. In accordance with JIS K7236: 2001, the epoxy equivalent can be measured by adding acetic acid and a solution of triethylammonium bromide in acetic acid to a solution obtained by dissolving the epoxy compound (B) in chloroform, and subjecting the resultant to potentiometric titration with 0.1 mol/L perchloric acid-acetic acid.

When the epoxy equivalent is less than 200 g/eq, the molecular weight of the epoxy compound tends to be small, resulting in insufficient heat resistance. The epoxy equivalent exceeding 3,000 g/eq is not preferred because, due to the resulting high molecular weight, the dispersibility in the thermoplastic polyester resin composition is deteriorated and a sufficient effect of improving durability may not be obtained. The epoxy equivalent is preferably 200 to 2,000 g/eq, more preferably 200 to 1,500 g/eq, and still more preferably 200 to 1,000 g/eq.

The epoxy compound (B) preferably includes an epoxy compound having two or more epoxy groups in one molecule. Examples of the epoxy compound having two or more epoxy groups in one molecule include glycidyl ether epoxy compounds which are polycondensates of a phenol compound such as bisphenol A, resorcinol, hydroquinone, pyrocatechol, bisphenol F, saligenin, bisphenol S, 4,4'-dihydroxybiphenyl, 1,5-dihydroxynaphthalene, 1,4-dihydroanthracene-9,10-diol, 6-hydroxy-2-naphthoic acid, 1,1-methylenebis-2,7-dihydroxynaphthalene, 1,1,2,2-tetrakis-4-hydroxyphenyl ethane, and cashew phenol, and epichlorohydrin; glycidyl ester epoxy compounds such as glycidyl ester phthalate; glycidyl amine epoxy compounds such as N,N'-methylenebis(N-glycidylaniline); novolac type epoxy compounds; glycidyl ethers of polyhydric hydroxyl compounds and the like. Two or more of these may be included. Further, liquid materials and solid materials can be used. In particular, bisphenol type epoxy compounds which are polycondensates of bisphenol and epichlorohydrin or novolac type epoxy compounds are preferred. By using these, a polyester resin composition which shows an excellent balance between durability and retention stability at a high temperature can be obtained.

As the bisphenol type epoxy compound, a bisphenol A type epoxy resin is preferred. In particular, a bisphenol A type epoxy resin having an epoxy equivalent of 300 to 2,000 g/eq is preferred. When the epoxy equivalent is 300 g/eq or more, the amount of gas generated at the time of melt processing can be suppressed. The epoxy equivalent is more preferably 500 g/eq or more. When the epoxy equivalent is 2,000 g/eq or less, both of the hydrolysis resistance and the melt retention stability at a high temperature can be achieved at a higher level. The epoxy equivalent is more preferably 1,500 g/eq or less, and still more preferably 1,000 g/eq or less.

Specific examples of the novolac type epoxy compounds include phenol novolac type epoxy compounds, cresol novolac type epoxy compounds, naphthol novolac type epoxy compounds, bisphenol A novolac type epoxy compounds, dicyclopentadiene-phenol added novolac type epoxy compounds, dimethylene phenylene-phenol added novolac type epoxy compounds, dimethylene biphenylene-phenol-added novolac type epoxy compounds and the like.

The epoxy compound (B) may also include an epoxy compound having only one epoxy group in one molecule. The structure of such an epoxy compound is not particularly limited. Examples thereof include glycidyl ether compounds, glycidyl ester compounds, epoxidized fatty acid ester compounds, glycidyl imide compounds, alicyclic epoxy compounds and the like. Two or more of these compounds may be used in combination.

Examples of the glycidyl ester compound included in the epoxy compound having only one epoxy group in one molecule include cyclohexanecarboxylic acid glycidyl ester, stearic acid glycidyl ester, lauric acid glycidyl ester, neodecanoic acid glycidyl ester, palmitic acid glycidyl ester, versatic acid glycidyl ester, oleic acid glycidyl ester, linoleic acid glycidyl ester, linolenic acid glycidyl ester, acrylic acid glycidyl ester, methacrylic acid glycidyl ester, benzoic acid glycidyl ester, 4-t-butylbenzoic acid glycidyl ester, p-toluic acid glycidyl ester.

Examples of the glycidyl ether compound include glycidyl ethers of monohydric alcohols and phenols having only one hydroxyl group. Examples of the glycidyl ethers of monohydric alcohols include butyl glycidyl ether, 2-ethylhexyl glycidyl ether, stearyl glycidyl ether, allyl glycidyl ether, benzyl glycidyl ether, ethylene oxide lauryl alcohol glycidyl ether and the like. Examples of the glycidyl ethers of monohydric phenols include phenyl glycidyl ether, p-t-butylphenyl glycidyl ether, p-sec-butylphenyl glycidyl ether, ethylene oxide phenol glycidyl ether, o-methylphenyl glycidyl ether and the like. Two or more of these compounds may be used.

Examples of the epoxidized fatty acid ester compound include a compound obtained by epoxidation of the unsaturated bond of an unsaturated fatty acid ester such as soybean oil and linseed oil, and specific examples thereof include epoxidized fatty acid octyl esters, epoxidized soybean oil, epoxidized linseed oil and the like.

Specific examples of glycidyl imide compounds include N-glycidyl phthalimide, N-glycidyl-4-methyl phthalimide, N-glycidyl-4,5-dimethyl phthalimide, N-glycidyl-3-methyl phthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidyl succinimide, N-glycidyl hexahydrophthalimide, N-glycidyl-1,2,3,6-tetrahydrophthalimide, N-glycidyl maleimide, N-glycidyl-α,β-dimethylsuccinimide, N-glycidyl-a-ethylsuccinimide, N-glycidyl-a-propyl succinimide, triglycidyl isocyanurate, N-glycidyl benzamide, N-glycidyl-p-methyl benzamide, N-glycidyl naphthamide or N-glycidylsteramide and the like. Among the glycidyl imide compounds, N-glycidyl phthalimide is preferred.

Specific examples of alicyclic epoxy compounds include 3,4-epoxycyclohexylmethyl-3,4-epoxycyclohexylcarboxylate, bis(3,4-epoxycyclohexylmethyl)adipate, vinylcyclohexene diepoxide, N-methyl-4,5-epoxycyclohexane-1,2-dicarboxylicimide, N-ethyl-4,5-epoxycyclohexane-1,2-dicarboxylic imide, N-phenyl-4,5-epoxycyclohexane-1,2-dicarboxylic imide, N-naphthyl-4,5-epoxycyclohexane-1,2-dicarboxylic imide, N-tolyl-3-methyl-4,5-epoxycyclohexane-1,2-dicarboxylic imide and the like.

The epoxy compound (B) is preferably a glycidyl ether compound, glycidyl ester compound, a novolac type epoxy compound, an epoxidized fatty acid ester compound, or a glycidyl imide compound from the viewpoint that the reaction between the epoxies can be limited, and the deterioration of the retention stability can be suppressed. Among them, the glycidyl ether compound, the glycidyl ester compound, the novolac type epoxy compound and the glycidyl imide compound are more preferred, and the glycidyl ether compound, the novolac type epoxy compound and the glycidyl imide compound are particularly preferred because the heat aging resistance and the hydrolysis resistance can be further improved.

The blending amount of the epoxy compound (B) is 0.05 to 10 parts by weight with respect to 100 parts by weight in total of the thermoplastic polyester resin (A) and the hydroxy group-containing resin (C). The hydrolysis resistance is reduced when the blending amount of the epoxy compound (B) component is less than 0.05 parts by weight. The blending amount is more preferably 0.1 parts by weight or more, and still more preferably, 0.3 parts by weight or more. On the other hand, when the blending amount of the epoxy compound (B) component is greater than 10 parts by weight, the heat resistance and the retention stability deteriorate. The blending amount is more preferably 8 parts by weight or less, and still more preferably, 5 parts by weight or less.

The thermoplastic polyester resin composition comprises, in addition to the thermoplastic polyester resin (A), a hydroxy group-containing resin (C) having a number average molecular weight of 2,000 to 500,000 and a halogen element content of 1,000 ppm or less (hereinafter sometimes "hydroxy group-containing resin (C)"). When the hydroxy group-containing resin (C) having a halogen element content of 1,000 ppm or less is blended to the thermoplastic polyester resin (A), the heat aging resistance against a long-term exposure in a hot-dry environment can be improved.

If the halogen element content contained in the hydroxy group-containing resin (C) is greater than 1,000 ppm, the dispersibility in the thermoplastic polyester resin tends to decrease during the melt processing, resulting in reduced mechanical strength and heat aging resistance of the molded article obtained from the thermoplastic polyester resin composition. In addition, a gas derived from a halogen element may be generated at the time of the melt processing or use of the molded article, which causes deterioration of molding processability and mold deposits. The halogen element content in the hydroxy group-containing resin (C) is preferably 800 ppm or less, more preferably 500 ppm, still more preferably 300 ppm or less, and most preferably 0 ppm.

The halogen element content means the total amount of the halogen elements contained in the hydroxy group-containing resin (C). That is, the halogen element content means the total amount of the halogen element contained in a molecule of the hydroxy group-containing resin (C) as a constituent element and the halogen element in an inorganic halogen compound contained in the hydroxy group-containing resin (C). The quantification method of the above-mentioned halogen element content can be carried out by an analysis method in accordance with IEC62321-3-2. That is, after burning at 1,000° C. in an atmosphere of argon and oxygen in a quartz combustion tube, the generated halogen gas is absorbed in an alkaline adsorbent, and the absorbed liquid is analyzed by ion chromatography. Thus, the halogen element content can be quantified.

The hydroxy group-containing resin (C) is a resin with a number average molecular weight of 2,000 to 500,000 having a hydroxy group in the molecule. As used herein, the number average molecular weight of the hydroxy group-containing resin (C) is a value in terms of polystyrene, determined by gel permeation chromatography (GPC) using tetrahydrofuran as a solvent.

When the number average molecular weight of the hydroxy group-containing resin (C) is less than 2,000, the molecular weight tends to decrease due to the progress of transesterification with the thermoplastic polyester resin (A) under exposure to a hot-dry environment, resulting in poor heat aging resistance. On the other hand, the number average molecular weight exceeding 500,000 is not preferred because the retention stability at the time of melting tends to deteriorate. The number average molecular weight is preferably 3,000 to 200,000, more preferably 4,000 to 100,000, and still more preferably 5,000 to 50,000.

The hydroxy group value of the hydroxy group-containing resin (C) is preferably 3 to 20 eq/kg. The hydroxy group value (eq/kg) of the hydroxy group-containing resin (C) is a value measured according to JIS K0070 and JIS K1557-1; hydroxy groups of the hydroxy group-containing resin (C) are acetylated with an acetylating reagent, and a phenolphthalein solution is added as an indicator, followed by a titration with a potassium hydroxide ethanol solution. The thermoplastic polyester resin composition containing a hydroxy group-containing resin (C) having a hydroxy group value within this range can exhibit excellent heat aging resistance and retention stability at the time of melting. By setting the hydroxy group value to 3 eq/kg or more, the reaction with the carboxy end group of the thermoplastic polyester resin (A) can be promoted, and the heat aging resistance can be improved. When the hydroxy group value is 20 eq/kg or less, on the other hand, the retention stability at the time of melting can be maintained. The hydroxy group value is more preferably 3 to 17 eq/kg, and more preferably 3 to 15 eq/kg.

Examples of the hydroxy group-containing resin (C) include polyhydroxy polyethers such as phenoxy resins, acrylic resins containing hydroxyalkyl (meth)acrylate as a structural unit, EVOH resins which are ethylene-vinyl alcohol copolymers, paravinylphenol resins, carbinol-modified or diol-modified silicone oils, polycarbonate diol and the like. Among these, from the viewpoint of heat resistance of the hydroxy group-containing resin itself and the dispersibility in the thermoplastic polyester resin (A), phenoxy resins and/or acrylic resins containing hydroxyalkyl (meth) acrylate as a structural unit are preferred. By using these hydroxy group-containing resins, the compatibility with the thermoplastic polyester resin and the dispersibility are improved. As a result, when a molded article obtained by melt-molding the thermoplastic polyester resin composition is used in a hot-dry environment, both of the heat aging resistance and the hydrolysis resistance can be achieved at a high level. Furthermore, while thermal degradation of the hydroxy group-containing resin itself is suppressed, effects such as improved retention stability at the time of melt processing, suppressed deterioration of moldability, suppressed mold deposits, and suppressed bleed-out to the surface of the molded article can be obtained.

Specific examples of polyhydroxypolyethers include phenoxy resins which are obtained by condensation of an aromatic dihydroxy compound such as hydroquinone, resorcin, 2,2'-biphenol, 4,4-biphenol, 4,4'-dihydroxybiphenyl, 4,4'-dihydroxydiphenyl ether, bis(hydroxyaryl)alkane, bis(hydroxyaryl)cycloalkane, 4,4'-dihydroxydiphenylsulfone, 4,4'-dihydroxydiphenylsulfide, 4,4'-dihydroxydiphenylketone, and 2,6-dihydroxynaphthalene and epichlorohydrin. Example of the bis(hydroxyaryl)alkane include bis(4-hydroxyphenyl)methane:bisphenol F, 2,2-bis(4-hydroxyphenylpropane):bisphenol A, 1,1-bis(4-hydroxyphenylethane): bisphenol AD, 2,2-bis(4-hydroxyphenyl)butane and the like. Example of the bis(hydroxyaryl)cycloalkane include 1,1-bis (hydroxyphenyl)pentane, 1,1-bis(4-hydroxyphenyl)hexane, 1,1-bis(hydroxyphenyl)heptane and the like. These phenoxy resins can be used alone or in combination of two or more.

For the acrylic resin containing hydroxyalkyl (meth) acrylate as a structural unit, examples of the hydroxyalkyl (meth)acrylate include 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth) acrylate, hydroxyoctyl (meth)acrylate, cyclohexanedimethanol mono(meth)acrylate and the like. The hydroxy group-containing acrylic resin may further contain, other than those mentioned above, an alkyl or aryl ester of acrylic acid, methacrylic acid or the like; an olefin compound such as ethylene, propylene, 1-butene or butadiene; a vinyl aromatic compound such as styrene; acrylonitrile, acrylamide, methacrylamide or the like. These hydroxy group-containing acrylic resins can be used alone or in combination of two or more.

The blending amount of the hydroxy group-containing resin (C) is 0.1 to 30 parts by weight with respect to 100 parts by weight in total of the thermoplastic polyester resin (A) and the hydroxy group-containing resin (C). In this range, both of the heat aging resistance and the hydrolysis resistance can be achieved at a high level. The blending amount of less than 0.1 parts by weight results in an insufficient effect of improving heat aging resistance. The blending amount is more preferably 0.2 parts by weight or more, still more preferably 0.5 parts by weight or more, and particularly preferably 1 part by weight or more. On the other hand, the blending amount exceeding 30 parts by weight is not preferred because the hydrolysis resistance and mechanical properties tend to decrease. The blending amount is more preferably 20 parts by weight or less, and still more preferably 10 parts by weight or less.

From the viewpoint of improvement in heat aging resistance and retention stability at the time of melting, the hydroxy group concentration (eq/kg) of the hydroxy group-containing resin (C) in the thermoplastic polyester resin composition is preferably 3 to 600 eq/kg. The hydroxy group concentration (eq/kg) of the hydroxy group-containing resin (C) in the thermoplastic polyester resin composition means the hydroxy group equivalent (eq) derived from the hydroxy group-containing resin (C) in 1 kg of the thermoplastic polyester resin composition. This value can be calculated from the blending amount of the hydroxy group-containing compound (C) to be blended with the thermoplastic polyester resin and from the hydroxy group value of the hydroxy group-containing compound (C). When the hydroxy group concentration of the hydroxy group-containing resin (C) in the thermoplastic polyester resin composition is 3 eq/kg or more, the reaction with the carboxy end group of the thermoplastic polyester resin (A) can be promoted, and the heat aging resistance can be improved. When the hydroxy group concentration is 600 eq/kg or less, the retention stability at the time of melting can be maintained. The hydroxy group concentration is more preferably 3 to 400 eq/kg, and more preferably 3 to 200 eq/kg.

The thermoplastic polyester resin composition preferably comprises a phosphorus compound (D) represented by general formula (1) (hereinafter sometimes "phosphorus compound (D)") as well. When the phosphorus compound (D) represented by general formula (1) is blended, the organic peroxide generated by oxidative degradation under a high temperature environment is reduced by the reducing phosphorus compound (D), and an increase in carboxyl groups generated as a decomposition product can be suppressed, resulting in improved heat aging resistance and hydrolysis resistance. In addition, when the phosphorus compound (D) is used in combination with the hydroxy group-containing resin (C), proton exchange between the hydrogen derived from hydroxyl group of the hydroxy group-containing resin (C) and the hydrogen derived from the phosphorus compound (D) occurs. As a result, the reducibility is improved, and the oxidative degradation can be further suppressed.

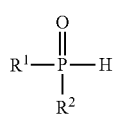

(1)

In general formula (1), R1 and R2 are independently selected from hydrogen (except when R1 and R2 are both hydrogen), OM (wherein 0 is a negatively charged oxygen atom, and M is a positively charged counter ion), an alkyl group having 1 to 20 carbon atoms, an alkylene group having 2 to 20 carbon atoms, an aryl group having 6 to 20 carbon atoms, an alkyloxy group having 1 to 20 carbon atoms, a polyoxyalkylene group consisting of alkylene having 2 to 4 carbon atoms, and an aryloxy group having 6 to 20 carbon atoms. The alkyl group, alkylene group, aryl group, alkyloxy group, polyoxyalkylene group, and aryloxy group may be substituted with a substituent selected from an OH group, a halogen, a COOH group, or a COOR3 group (wherein R3 is an alkyl group having 1 to 4 carbon atoms) and an NH2 group. The number of substitutions in this example is 1 or 2. R1 and R2 may be linked.

Specific examples of the phosphorus compound (D) represented by general formula (1) include phosphonate compounds, phosphinate compounds and the like.

Examples of the phosphonate compound include phosphonic acid, alkyl phosphonate ester, aryl phosphonate ester, and metal salts thereof. Specific examples include dimethyl phosphonate, diethyl phosphonate, diphenyl phosphonate, and metal salts of phosphonic acid.

Examples of the phosphinate compound include phosphinic acid, alkyl phosphinate ester, aryl phosphinate ester, alkylated phosphinic acid, arylated phosphinic acid, alkyl esters or aryl esters thereof, metal salts thereof and the like. Specific examples include phosphinic acid, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylylphosphinic acid, naphthylphosphinic acid, anthrylphosphinic acid, alkyl esters or aryl esters thereof, metal salts thereof and the like.

Among these, a metal salt of phosphonic acid or a metal salt of phosphinic acid is preferred because, in addition to the suppression of the oxidative degradation of the thermoplastic polyester resin (A), the oxidative degradation of the epoxy compound (B) can be suppressed, and the hydrolysis resistance and the color of the molded article can be further improved. A metal salt of phosphinic acid is more preferred, and a sodium salt of phosphinic acid is particularly preferred.

The blending amount of the phosphorus compound (D) represented by general formula (1) is preferably 0.01 to 1 part by weight with respect to 100 parts by weight in total of the thermoplastic polyester resin (A) and the hydroxy group-containing resin (C). The oxidative degradation resistance can be improved when the blending amount of the phosphorus compound (D) is 0.01 parts by weight or more. The blending amount is more preferably 0.02 parts by weight or more, and still more preferably, 0.05 parts by weight or more. When the blending amount of the phosphorus compound (D) is 1 part by weight or less, on the other hand, mechanical properties, hydrolysis resistance and bleed-out resistance can be improved. The blending amount is more preferably 0.5 parts by weight or less, and still more preferably, 0.3 parts by weight or less.

It is preferred that the thermoplastic polyester resin composition further contains a fiber reinforcement (E). The mechanical strength and the heat resistance can be further improved when the fiber reinforcement (E) is blended.

Examples of the fiber reinforcement (E) include glass fibers, aramid fibers, carbon fibers, alumina fibers, silicon carbide fibers and the like, and preferably glass fibers can be used. Examples of the glass fibers preferably used include chopped strand-type or robing-type glass fibers. A glass fiber treated with a silane coupling agent such as an aminosilane compound and an epoxysilane compound and/or a binder containing urethane, a copolymer comprising acrylic acid such as acrylic acid/styrene copolymer, a copolymer comprising maleic anhydride such as a methyl acrylate/methyl methacrylate/maleic anhydride copolymer, vinyl acetate, one kind or more of an epoxy compound such as bisphenol A diglycidyl ether, a novolac type epoxy compound and the like is/are also preferably used. The glass fiber treated with a binder containing a copolymer comprising maleic anhydride is more preferred because the hydrolysis resistance can be further improved. The silane coupling agent and/or the binder may be mixed and used in an emulsion liquid. The fiber reinforcement preferably has a fiber diameter of 1 to 30 μm. From the viewpoint of the dispersibility of the fiber reinforcement in the resin, the lower limit thereof is preferably 5 μm. From the viewpoint of the mechanical strength, the upper limit thereof is preferably 15 μm. The cross section of the fiber is usually circular. However, it is possible to use a fiber reinforcement with any cross section, for example, a glass fiber with an elliptic cross section, a glass fiber with a flattened elliptic cross section, and a glass fiber with a cocoon-shaped cross section, of an arbitrary aspect ratio, which offers an effect of improving the flowability during injection molding, and of producing a molded article with less warpage.

The blending amount of the fiber reinforcement (E) is preferably 1 to 100 parts by weight with respect to 100 parts by weight in total of the thermoplastic polyester resin (A) and the hydroxy group-containing resin (C). The mechanical strength and the heat resistance can further be improved when the blending amount of the fiber reinforcement (E) is 1 part by weight or more. The blending amount is more preferably 20 parts by weight or more, and still more preferably, 30 parts by weight or more. On the other hand, when the fiber reinforcement (E) is blended in an amount of 100 parts by weight or less, a composition which shows an excellent balance between the mechanical strength and the molding processability can be obtained. The blending amount is more preferably 95 parts by weight or less, and still more preferably, 90 parts by weight or less.

The thermoplastic polyester resin composition can further include another reinforcement different from the fiber reinforcement, to the extent that the desired effect is not impaired. Incorporation of a reinforcement other than the fiber reinforcement partially improves the crystallization characteristics, arc-resistance, anisotropy, mechanical strength, flame retardancy or heat distortion temperature of the resulting molded article.

Examples of the reinforcement other than the fiber reinforcement include inorganic fillers in the form of needles, granules, powders and layers. Specific examples thereof include glass beads, milled fibers, glass flakes, potassium titanate whiskers, calcium sulfate whiskers, wollastonite, silica, kaolin, talc, calcium carbonate, zinc oxide, magnesium oxide, aluminum oxide, a mixture of magnesium oxide and aluminum oxide, silicic acid fine powder, aluminum silicate, silicon oxide, smectite clay minerals (montmorillonite, hectorite and the like) vermiculite, mica, fluorine taeniolite, zirconium phosphate, titanium phosphate, dolomite and the like. Two or more of these may be included. The use of milled fibers, glass flakes, kaolin, talc and mica allows for providing a molded article with less warpage, because they are effective in anisotropy. Further, when calcium carbonate, zinc oxide, magnesium oxide, aluminum oxide, a mixture of magnesium oxide and aluminum oxide, silicic acid fine powder, aluminum silicate and silicon oxide are included in an amount of 0.01 to 1 part by weight with respect to 100 parts by weight in total of the thermoplastic polyester resin (A) and the hydroxy group-containing resin (C), the retention stability can further be improved.

Moreover, the reinforcement other than the above-mentioned fiber reinforcement may be surface treated with a coupling agent, an epoxy compound, or by ionization. The inorganic filler in the form of granules, powders and layers preferably has an average particle size of 0.1 to 20 μm from the viewpoint of improving the impact strength. The average particle size is particularly preferably 0.2 μm or more from the viewpoint of the dispersibility of the inorganic filler in the resin, and is preferably 10 μm or less from the viewpoint of the mechanical strength. The total of the blending amount of the inorganic filler other than the fiber reinforcement and the blending amount of the fiber reinforcement is preferably 100 parts by weight or less with respect to 100 parts by weight in total of the thermoplastic polyester resin (A) and the hydroxy group-containing resin (C), from the viewpoint of improving the flowability during molding and the durability of the molding machine and mold. The blending amount of the inorganic filler other than the fiber reinforcement is preferably 1 to 50 parts by weight with respect to 100 parts by weight in total of the thermoplastic polyester resin (A) and the hydroxy group-containing resin (C). When the blending amount of the inorganic filler other than the fiber reinforcement is 1 part by weight or more, it is possible to reduce the anisotropy and to further improve the retention stability. The blending amount is more preferably 2 parts by weight or more, and still more preferably, 3 parts by weight or more. On the other hand, the mechanical strength can be improved when the blending amount of the inorganic filler other than the fiber reinforcement is 50 parts by weight or less.

The thermoplastic polyester resin composition may include one or more any additives such as a reaction accelerator, phosphorus-based stabilizer, an ultraviolet absorber, a photo stabilizer, a release agent, a plasticizer and an antistatic agent, to the extent that the desired effect is not impaired.

Among the above-mentioned additives, examples of the reaction accelerator include nitrogen or phosphorus-containing hindered amine compounds, organic phosphines and salts thereof, amidine compounds, imidazoles and the like because they are able to facilitate further the reaction between the carboxy groups of the thermoplastic polyester resin (A) and the epoxy compound (B), thereby improving the long-term hydrolysis resistance and heat aging resistance.

Specific examples of the hindered amine compound include 4-benzoyloxy-2,2,6,6-tetramethylpiperidine, bis-(2,2,6,6-tetramethyl-4-piperidyl)adipate, bis-(2,2,6,6-tetramethyl-4-piperidyl)suberate, bis-(2,2,6,6-tetramethyl-4-piperidyl)sebacate, bis-(2,2,6,6-tetramethyl-4-piperidyl) phthalate, bis-(2,2,6,6-tetramethyl-4-piperidyl) terephthalate, bis-(1,2,2,6,6-pentamethyl-4-piperidyl) sebacate, bis-(1,2,2,6,6-pentamethyl-4-piperidyl) terephthalate, N,N'-bis-(2,2,6,6-tetramethyl-4-piperidyl) isophthalamide, N,N'-bis-(2,2,6,6-tetramethyl-4-piperidyl) adipamide, 2,2,4,4-tetramethyl-7-oxa-3,20-diazadispiro[5,1,11,2]heneicosan-21-one, bis-(1,2,2,6,6-pentamethyl-4-piperidyl)-n-butyl(3,5-di-t-butyl-4-hydroxybenzyl) malonate, bis-(2,2,6,6-tetramethyl-4-piperidyl)-n-butyl(3,5-di-t-butyl-4-hydroxybenzyl)malonate, tetra-(2,2,6,6-tetramethyl-4-piperidyl)ester of butanetetracarboxylic acid, 1-[2-[3-(3,5-di-t-butyl-4-hydroxyphenyl)propionyloxy] ethyl]-4-[3-(3,5-di-t-butyl-4-hydroxyphenyl)propionyloxy] 2,2,6,6-tetramethylpiperidine, poly[[6-(1,1,3,3-tetramethyl-butyl)imino-1,3,5-triazine-2,4-diyl][(2,2,6,6-tetramethylpiperidyl)imino]hexamethylene[(2,2,6,6-tetramethyl-4-piperidyl)imino]], tetrakis(1,2,2,6,6-pentamethyl-4-piperidyl)1,2,3,4-butanetetracarboxylate, tetrakis(2,2,6,6-tetramethyl-4-piperidyl)1,2,3,4-butanetetracarboxylate, dimethyl succinate-1-(2-hydroxyethyl)-4-hydroxy-2,2,6,6-tetramethylpiperidine, condensates of 1,2,3,4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol, condensates of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)diethanol and the like.

Among the hindered amine compounds, NH type hindered amines with the 2,2,6,6-tetramethyl-4-piperidyl structure are preferred because they are a secondary amine which has an active hydrogen and is strongly basic and can promote the reaction between the epoxy compound (B) and the carboxyl group.

Examples of the amidine compound include 1,8-diazabicyclo(5,4,0)undecene-7, 1,5-diazabicyclo (4,3,0) nonene-5, 5,6-dibutylamino-1,8-diazabicyclo (5,4,0) undecene-7,7-methyl-1,5,7-triazabicyclo (4,4,0) decene-5 and the like. Further, as the above amidine compound, a compound in the form of a salt with an inorganic acid or an organic acid such as 1,8-diazabicyclo (5,4,0) undecene-7-tetraphenylborate, can also be used.

Examples of the organic phosphine and salts thereof include triparatolylphosphine, tris-4-methoxyphenylphosphine, tetrabutylphosphonium bromide, butyltriphenylphosphonium bromide, benzyltriphenylphosphonium bromide, tetraphenylphosphonium bromide, tetraphenylphosphonium tetraphenylborate, triphenylphosphine, triphenylphosphine triphenylborane, triphenylphosphine 1,4-benzoquinone adduct and the like.

Examples of the imidazole include 2-methylimidazole, 2-aminoimidazole, 2-methyl-1-vinylimidazole, 2-ethyl-4-methylimidazole, 2-heptadecylimidazole, 2-phenylimidazole, 2-undecylimidazole, 1-allylimidazole, 1-cyanoethyl-2-methylimidazole, 1-cyanoethyl-2-undecylimidazole, 1-cyanoethyl-2-undecylimidazolium trimellitate, 1-benzyl-2-methylimidazole, 1-cyanoethyl-2-ethyl-4-methylimidazole, 1-cyanoethyl-2-phenylimidazolium trimellitate, 1-dodecyl-2-methyl-3-benzylimidazolium chloride, 2-methylimidazolium isocyanurate, 2-phenylimidazolium isocyanurate, 2,4-diamino-6-[2-methylimidazolyl-(1)]ethyl-S-triazine, 1,3-dibenzyl-2-methylimidazolium chloride, 1,3-diaza-2,4-cyclopentadiene, 1-cyanoethyl-2-phenyl-4,5-di(cyanoethoxymethyl)imidazole, 2-phenyl-4,5-dihydroxymethylimidazole, 2-phenyl-4-methyl-5-hydroxymethylimidazole, 2,4-diamino-6-[2-undecylimidazolyl-(1)]ethyl-S-triazine and the like.

The blending amount of the reaction accelerator is preferably 0.001 to 1 part by weight with respect to 100 parts by weight in total of the thermoplastic polyester resin (A) and the hydroxy group-containing resin (C). The long-term hydrolysis resistance can be further improved when the blending amount of the reaction accelerator is 0.001 parts by weight or more. On the other hand, when the blending amount is 1 part by weight or less, it is possible to further improve the long-term hydrolysis resistance while maintaining the mechanical properties.

Furthermore, a phosphorus-based stabilizer may be blended as the above-mentioned additive. Incorporation of the phosphorus-based stabilizer can suppress the crosslinking reaction between epoxy compounds (B) and can further improve the retention stability at a high temperature of 270° C. or more.

The phosphorus-based stabilizer is a compound containing a structure in which two or more oxygen atoms are bound to a phosphorus atom with a lone pair. When the above-mentioned structure is contained, the structure is coordinated to the phenoxy radicals and/or quinones, which are derived from the novolac type epoxy resin and are the cause of the coloration, thereby allowing for the decomposition of the phenoxy radicals and/or quinones, or the prevention of the coloration. In a common phosphorus compound, the upper limit of the number of oxygen atoms capable of binding to a phosphorus atom with a lone pair is 3, based on the valency of a phosphorus atom, which is 5.

Regarding the examples of the phosphorus-based stabilizer, specifically, examples of the compound containing a structure in which two oxygen atoms are bound to a phosphorus atom with a lone pair include phosphonite compounds; and examples of the compound containing a structure in which three oxygen atoms are bound to a phosphorus atom with a lone pair include phosphite compounds.

The phosphonite compound may be, for example, a condensate of a phosphonous acid compound such as phenylphosphonous acid or 4,4'-biphenylene diphosphonous acid and an aliphatic alcohol having 4 to 25 carbon atoms and/or a phenol compound such as 2,6-di-t-butylphenol or 2,4-di-t-butyl-5-methylphenol. Specific examples thereof include: bis(2,4-di-t-butyl-5-methylphenyl)-phenylphosphonite, tetrakis(2,4-di-t-butyl-5-methylphenyl)-4,4'-biphenylene diphosphonite, tetrakis(2,4-di-t-butylphenyl)-4,4'-biphenylene diphosphonate and the like.

Among these, tetrakis(2,4-di-t-butyl-5-methylphenyl)-4,4'-biphenylene diphosphonite and tetrakis(2,4-di-t-butylphenyl)-4,4'-biphenylene diphosphonite are preferred, from the viewpoint of the thermal stability of the phosphorus-based stabilizer.

The phosphite compound may be, for example, a condensation product of a phosphorous acid, an aliphatic alcohol having 4 to 25 carbon atoms, a polyol such as glycerol or pentaerythritol, and/or a phenol compound such as 2,6-di-t-butylphenol or 2,4-di-t-butylphenol. Specific examples thereof include: tris(alkylaryl) phosphites (however, the alkyl group in this example is a branched alkyl group having 3 to 6 carbon atoms) such as triisodecyl phosphite, trisnonylphenyl phosphite, diphenyl isodecyl phosphite, phenyl diisodecyl phosphite, 2,2-methylenebis(4,6-di-t-butylphenyl)octyl phosphite, 4,4'-butylidenebis(3-methyl-6-t-butylphenyl)ditridecyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris[2-(1,1-dimethylpropyl)-phenyl] phosphite, and tris[2,4-(1,1-dimethylpropyl)-phenyl] phosphite, bis(alkylaryl)pentaerythritol diphosphites (however, the alkyl group in this example is an alkyl group having 3 to 9 carbon atoms) such as bis(2-t-butylphenyl)phenyl phosphite, tris(2-cyclohexylphenyl) phosphite, tris(2-t-butyl-4-phenylphenyl) phosphite, bis(octyl)pentaerythritol diphosphite, bis(octadecyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, bis(nonylphenyl)pentaerythritol diphosphite, and bis(nonylphenyl)pentaerythritol diphosphate; and the like. Two or more of these compounds may be used.

Among these, bis(alkylaryl)pentaerythritol diphosphite is preferred; and bis(2,4-di-t-butyl-4-methylphenyl)pentaerythritol diphosphite and bis(2,6-di-t-butyl-4-methylphenyl)pentaerythritol diphosphite are more preferred, from the viewpoint of the thermal stability of the phosphorus-based stabilizer.

The blending amount of the phosphorus-based stabilizer can be adjusted depending on the type and the blending amount of the epoxy compound (B). However, the blending amount of the phosphorus-based stabilizer is preferably 0.01 to 1 part by weight with respect to 100 parts by weight in total of the thermoplastic polyester resin (A) and the hydroxy group-containing resin (C). The color of the resulting molded article can be improved when the blending amount of the phosphorus-based stabilizer is 0.01 parts by weight or more. The blending amount is more preferably 0.05 parts by weight or more. When the blending amount of the phosphorus-based stabilizer is 1 part by weight or less, on the other hand, the hydrolysis resistance and the mechanical properties can further be improved. The blending amount is more preferably 0.5 parts by weight or less.

The resin composition may also include a thermoplastic resin other than the component (A), to the extent that the desired effect is not impaired to improve the moldability, dimensional accuracy, mold shrinkage and toughness of the resin composition and the resulting molded article. Examples of the thermoplastic resin other than the component (A) include: olefin resins, vinyl resins, polyamide resins, polyacetal resins, polyurethane resins, aromatic polyketone resins, aliphatic polyketone resins, polyphenylene sulfide resins, polyether ether ketone resins, polyimide resins, thermoplastic starch resins, polyurethane resins, aromatic polycarbonate resins, polyarylate resins, polysulfone resins, polyethersulfone resins, phenoxy resins, polyphenylene ether resins, poly-4-methylpentene-1, polyetherimide resins, cellulose acetate resins, polyvinyl alcohol resins and the like.

Specific examples of the above-mentioned olefin resin include ethylene/propylene copolymers, ethylene/propylene/non-conjugated diene copolymers, ethylene-butene-1 copolymers, ethylene/glycidyl methacrylate copolymers, ethylene/butene-1/maleic anhydride copolymers, ethylene/propylene/maleic anhydride copolymers, ethylene/maleic anhydride copolymers and the like.

Specific examples of the above-mentioned vinyl resin include: vinyl (co)polymers such as methyl methacrylate/styrene resins (MS resin), methyl methacrylate/acrylonitrile resins, polystyrene resins, acrylonitrile/styrene resins (AS resins), styrene/butadiene resins, styrene/N-phenylmaleimide resins, and styrene/acrylonitrile/N-phenylmaleimide resins, styrene-based resins modified with a rubbery polymer such as acrylonitrile/butadiene/styrene resins (ABS resins), acrylonitrile/butadiene/methyl methacrylate/styrene resins (MABS resins), and high impact polystyrene resins; block copolymers such as styrene/butadiene/styrene resins, styrene/isoprene/styrene resins, and styrene/ethylene/butadiene/styrene resins; a multilayer structure of dimethylsiloxane/butyl acrylate copolymer (core layer) and a methyl methacrylate polymer (shell layer), a multilayer structure of dimethylsiloxane/butyl acrylate copolymer (core layer) and acrylonitrile/styrene copolymer (shell layer), a multilayer structure of a butanediene/styrene copolymer (core layer) and a methyl methacrylate polymer (shell layer), a core-shell rubber of a butanediene/styrene copolymer (core layer) and a acrylonitrile/styrene copolymer (shell layer) and the like.

Among them, from the viewpoint of improving the toughness and the hydrolysis resistance of the resin composition, it is preferred to add an olefin resin having high hydrolysis resistance.

The blending amount of the olefin resin is preferably 0.1 to 30 parts by weight with respect to 100 parts by weight in total of the thermoplastic polyester resin (A) and the hydroxy group-containing resin (C). The toughness and the hydrolysis resistance are further improved when the blending amount is 0.1 parts by weight or more. The blending amount is more preferably 0.5 parts by weight or more, and still more preferably, 1 part by weight or more. On the other hand, the mechanical properties are further improved when the blending amount is 30 parts by weight or less. The blending amount is more preferably 20 parts by weight or less, and still more preferably, 10 parts by weight or less.

The resin composition can further include a multi-functional compound with a molecular weight of less than 2,000 having three or four functional groups and containing one or more alkylene oxide units (hereinafter sometimes "multi-functional compound"). Incorporation of such a compound serves to improve the flowability during molding such as injection molding. Examples of the above-mentioned functional group include hydroxy groups, aldehyde groups, carboxylic acid groups, sulfo groups, amino groups, isocyanate groups, carbodiimide groups, oxazoline groups, oxazine groups, ester groups, amide groups, silanol groups, silyl ether groups and the like. Among them, three or four functional groups which are the same or different from each other are preferably contained. It is still more preferred that the three or four functional groups contained be the same, particularly from the viewpoint of improving the flowability, mechanical properties, durability, heat resistance and productivity.

In particular, it is preferred that a compound containing an ethylene oxide unit or a propylene oxide unit as the alkylene oxide unit be used from the viewpoint of improving the flowability, recycling properties, durability, heat resistance and mechanical properties. Further, it is particularly preferred that a compound containing a propylene oxide unit be used from the viewpoint of improving the long-term hydrolysis resistance and toughness (tensile elongation at break). Regarding the number of the alkylene oxide units, the alkylene oxide unit per one functional group is preferably 0.1 or more, more preferably, 0.5 or more, and still more preferably, 1 or more, from the viewpoint of improving the flowability. On the other hand, from the viewpoint of improving the mechanical properties, the alkylene oxide unit per one functional group is preferably 20 or less, more preferably, 10 or less, and still more preferably, 5 or less.

The thermoplastic polyester resin composition can include a flame retardant to the extent that the desired effect is not impaired. Examples of the flame retardant include phosphorus-based flame retardants, halogen-based flame retardants such as bromine-based flame retardants, salts of a triazine compound and cyanuric acid or isocyanuric acid, silicone-based flame retardants, inorganic flame retardants and the like. Two or more of these may be included.

The resin composition can further include one or more of carbon black, titanium oxide and various types of color pigments and dyes. By including such a pigment or dye, it is possible to adjust the color of the resin composition and the resulting molded article to various types of colors, and to improve the weatherability (light resistance) and electrical conductivity thereof. Examples of the carbon black include channel black, furnace black, acetylene black, anthracene black, lamp black, soot of burnt pine, graphite and the like. The carbon black to be used preferably has an average particle size of 500 nm or less, and a dibutyl phthalate absorption of 50 to 400 cm3/100 g. As the titanium oxide, one having a rutile-type or anatase-type crystalline structure, and an average particle size of 5 µm or less is preferably used.

These carbon black, titanium oxide and various types of color pigments and dyes may be treated with aluminum oxide, silicon oxide, zinc oxide, zirconium oxide, a polyol, a silane coupling agent or the like. Further, these carbon black, titanium oxide and various types of color pigments and dyes may be used in the form of a mixture material with various types of thermoplastic resins, obtained by melt blending, or by simply blending these components to improve the dispersibility of such pigments and dyes in the resin composition, and the handleability during the production process.

The blending amount of the pigment or dye is preferably 0.01 to 3 parts by weight with respect to 100 parts by weight in total of the thermoplastic polyester resin (A) and the hydroxy group-containing resin (C). The blending amount is more preferably 0.03 parts by weight or more from the viewpoint of the prevention of uneven coloration, and preferably 1 part by weight or less from the viewpoint of the mechanical strength.

The thermoplastic polyester resin composition has preferably a tensile strength retention of 75% or more, as calculated by the equation: tensile strength retention (%)= (tensile strength after exposure/tensile strength before exposure)×100, after a ⅛ inch test piece molded in accordance with ASTM D638 (2005) is exposed to an atmosphere at a temperature of 190° C. for 500 hours, and preferably has a tensile strength retention of 90% or more, as calculated by the equation: tensile strength retention (%)=(tensile strength after exposure/tensile strength before exposure)×100, after a ⅛ inch test piece molded according to ASTM D638 (2005)

is exposed to an atmosphere with a relative humidity of 100% and at a temperature of 121° C. for 50 hours.

As an indicator of the heat aging resistance of a molded article composed of a polyester resin composition, a value obtained from tensile strength retention (%)=(tensile strength after exposure/tensile strength before exposure)× 100 after a ⅛ inch test piece molded in accordance with ASTM D638 (2005) is exposed to an atmosphere at a temperature of 190° C. for 500 hours, is used. To suppress the oxidative decomposition due to thermal degradation of the polyester resin, the molded article preferably has a tensile strength retention of 75% or more after the exposure to an atmosphere at a temperature of 190° C. for 500 hours. The tensile strength retention of less than 75% means that the decomposition of the main chain and the decrease in the molecular weight due to oxidative degradation of the polyester resin progress. When the decomposition of the main chain and the decrease in the molecular weight are in progress, the surface of the molded article becomes brittle and cracks occur easily, resulting in the decreased heat aging resistance. The tensile strength retention is preferably 80% or more, more preferably 85% or more, and still more preferably 90% or more. The value of the tensile strength retention closer to 100% means that the thermal oxidative degradation of the polyester resin is not in progress, indicating higher heat aging resistance.

As an indicator of hydrolysis resistance of a molded article composed of a polyester resin composition, a value obtained from tensile strength retention (%)=(tensile strength after exposure/tensile strength before exposure)× 100 after a ⅛ inch test piece molded in accordance with ASTM D638 (2005) is exposed to an atmosphere with a relative humidity of 100% and at a temperature of 121° C. for 50 hours, is used. To suppress the decrease in the molecular weight due to hydrolysis of the polyester resin, the molded article preferably has a tensile strength retention of 90% or more after the exposure to an atmosphere with a relative humidity of 100% and at a temperature of 121° C. for 50 hours. The tensile strength retention of less than 90% means that the carboxy end groups increase due to hydrolysis of the polyester resin, and the decrease in the molecular weight progresses. The increase in carboxy end groups due to hydrolysis of the main chain thus facilitates the decrease in the molecular weight of the polyester resin, resulting in reduced mechanical properties. The above-mentioned tensile strength retention is preferably 92% or more, and more preferably 95% or more. The value of the tensile strength retention closer to 100% means that the decrease in the molecular weight due to the progress of hydrolysis of the polyester resin is suppressed, indicating higher hydrolysis resistance.

The thermoplastic polyester resin composition can be obtained, for example, by melt blending the components (A) to (C), and other components, as required.

Examples of the method for melt blending include: a method in which the thermoplastic polyester resin (A), the epoxy compound (B), the hydroxy group-containing resin (C) as well as the reaction accelerator and various types of additives as required are premixed, and the resulting mixture is then fed to an extruder or the like to be sufficiently melt blended; a method in which a specified amount of each of the components is fed to an extruder or the like, using a metering feeder such as a weight feeder, to be sufficiently melt blended; and the like.

The premixing can be carried out, for example, by dry blending; or by utilizing a mechanical mixing apparatus such as a tumble mixer, a ribbon mixer or a Henschel mixer. The fiber reinforcement (E) and the inorganic filler other than the fiber reinforcement may be fed through a side feeder installed between the feeding portion and the vent portion of a multi-screw extruder such as a twin-screw extruder. When a liquid additive is used, the additive may be fed, for example, through a liquid feeding nozzle installed between the feeding portion and the vent portion of a multi-screw extruder such as a twin-screw extruder, using a plunger pump; or through the feeding portion or the like, using a metering pump.

It is preferred that the thermoplastic polyester resin composition be formed into pellets, and then the pellets be subjected to molding processing. Formation of pellets can be carried out, for example, by discharging the thermoplastic polyester resin composition in the form of strands, and then cutting the resulting strands with a strand cutter, using a single-screw extruder, a twin-screw extruder, a triple-screw extruder, a conical extruder or a kneader-type mixer, equipped with "Uni-melt" or "Dulmage" type screw.

By melt-molding the thermoplastic polyester resin composition, it is possible to obtain a molded article in the form of a film, fiber, and other various types of shapes. Examples of the melt-molding method include methods such as injection molding, extrusion molding, blow molding and the like. The injection molding is particularly preferably used.

In addition to a regular injection molding method, other types of injection molding methods are also known such as gas assisted molding, two-color molding, sandwich molding, in-mold molding, insert molding, injection press molding and the like, and the resin composition can be prepared using any of the methods.

The molded article can be used for molded articles of mechanical machine parts, electric components, electronic components and automotive parts, utilizing its excellent long-term heat aging resistance and hydrolysis resistance, excellent mechanical properties such as tensile strength and elongation, and excellent heat resistance. Further, the molded article is useful particularly in the application of exterior components, because the long-term heat aging resistance and hydrolysis resistance can be both achieved at a high level.

Specific examples of the mechanical machine parts, electric components, electronic component and automotive parts include: breakers, electromagnetic switches, focus cases, flyback transformers, molded articles for fusers of copying machines and printers, general household electrical appliances, housings of office automation equipment, parts of variable capacitor case, various types of terminal boards, transformers, printed wiring boards, housings, terminal blocks, coil bobbins, connectors, relays, disk drive chassis, transformers, switch parts, wall outlet parts, motor components, sockets, plugs, capacitors, various types of casings, resistors, electric and electronic components into which metal terminals and conducting wires are incorporated, computer-related components, audio components such as acoustic components, parts of lighting equipment, telegraphic communication equipment-related components, telephone equipment-related components, components of air conditioners, components of consumer electronics such as VTR and television set, copying machine parts, facsimile machine parts, components of optical devices, components of automotive ignition system, connectors for automobiles, various types of automotive electrical components and the like.

Examples

The effects of thermoplastic polyester resin composition will now be described specifically, by way of Examples.

Raw materials to be used in the Examples and Comparative Examples will be shown below. All "%" and "part(s)" as used herein represent "% by weight" and "part(s) by weight", respectively. "I" used in the names of the resins below indicates that the resin is a copolymer.

Thermoplastic Polyester Resin (A)

<A-1> Polybutylene terephthalate resin: a polybutylene terephthalate resin manufactured by Toray Industries, Inc., having a melting point of 225° C. and an intrinsic viscosity of 0.80 dL/g measured at 25° C. using o-chlorophenol as a solvent was used.

<A-2> Polyethylene terephthalate resin: a polyethylene terephthalate resin manufactured by Toray Industries, Inc., having a melting point of 255° C. and an intrinsic viscosity of 0.63 dL/g measured at 25° C. using o-chlorophenol as a solvent was used.

Epoxy Compound (B)

<B-1> Bisphenol A type epoxy: "jER" (registered trademark) 1004K manufactured by Mitsubishi Chemical Corporation was used (epoxy equivalent: 926 g/eq).

<B-2> Dicyclopentadiene type novolac epoxy: "EPICLON" HP-7200H manufactured by DIC Corporation was used (epoxy equivalent: 275 g/eq).

<B-3> Neodecanoic acid glycidyl ester: "CARDURA" (registered trademark) E-10P manufactured by Momentive Performance Materials Inc. was used (epoxy equivalent: 239 g/eq).

<B-4> N-glycidyl phthalimide: "Denacol" (registered trademark) EX-731 manufactured by Nagase ChemteX Corporation was used (epoxy equivalent: 216 g/eq).

<B'-5> Glycidyl phenyl ether: Glycidyl phenyl ether manufactured by Tokyo Chemical Industry Co., Ltd. was used (epoxy equivalent: 152 g/eq).

Hydroxy Group-Containing Resin (C) Having a Halogen Element Content of 1,000 ppm or Less <C-1> Bisphenol A type phenoxy resin: "jER" (registered trademark) 1010 manufactured by Mitsubishi Chemical Corporation was used (hydroxy group value: 3.3 eq/kg, number average molecular weight: 5,500).

<C-2> Bisphenol A type phenoxy resin: PKHB manufactured by Gabriel was used (hydroxy group value: 3.6 eq/kg, number average molecular weight: 10,000).

<C-3> Hydroxy group-containing acrylic polymer: "ARUFON" (registered trademark) UH-2170 manufactured by Toagosei Co., Ltd. was used (hydroxy group value: 7.7 eq/kg, number average molecular weight: 6,500).

<C-4> Ethylene-vinyl alcohol copolymer: "EVAL" (registered trademark) F171B manufactured by Kuraray Co., Ltd. was used (hydroxy group value: 17 eq/kg, number average molecular weight: 25,000).

All of <C-1> to <C-4> had a Halogen Element Content of 1000 ppm or Less.

<C'-1> Dipentaerystol: Dipentaerystol manufactured by Koei Chemical Company, Ltd. was used (hydroxy group value: 24 eq/kg, number average molecular weight: 254.3, halogen element content: 1000 ppm or less).

<C'-2> Halogen-containing epoxy resin-based flame retardant: Tetrabromobisphenol A-epoxy polymer (ECX-30) manufactured by DIC Corporation was used (hydroxy group value: 1.7 eq/kg, number average molecular weight: 3,000, halogen element content: 580000 ppm). The phosphorus compound (D) represented by the above-mentioned general formula (1)

<D-1> Sodium phosphinate: Sodium phosphinate (reagent) manufactured by Tokyo Chemical Industry Co., Ltd. was used.

Fiber Reinforcement (E)

<E-1> Glass fiber treated with a binder containing a copolymer comprising maleic anhydride: ECS03T-253 manufactured by Nippon Electric Glass Co., Ltd., with the diameter of the cross section 13 μm, and the fiber length of 3 mm was used.

<E-2> Glass fiber treated with a binder containing an epoxy compound: Glass fiber ECS03T-187 manufactured by Nippon Electric Glass Co., Ltd., with a diameter of the cross section of 13 μm, and a fiber length of 3 mm was used.

Methods for Measuring Properties

In Examples and Comparative Examples, the properties were evaluated according to the following measurement methods.

1. Mechanical Properties (Tensile Strength and Tensile Elongation)

Using an injection molding machine, IS55EPN, manufactured by Toshiba Machine Co., Ltd., under the temperature conditions of the molding temperature of 250° C. or 270° C. and the mold temperature of 80° C. in the use of a polybutylene terephthalate resin as the component (A), or of the molding temperature of 270° C. or 290° C. and the mold temperature of 80° C. in the use of a polyethylene terephthalate resin as the component (A), injection molding was carried out under the molding cycle conditions consisting of a 10-second period of injection and pressure dwelling in total, and a 10-second period of cooling to prepare ASTM No. 1 dumbbell-shaped test specimens for evaluating the tensile properties, having a test specimen thickness of ⅛ inch (about 3.2 mm). The maximum tensile strength point (tensile strength) and the maximum tensile elongation point (tensile elongation) of the resulting test specimens for evaluating the tensile properties were measured, according to ASTM D638 (2005). The mean of the measured values of the five test specimens was taken. Materials with higher values of the tensile strength are evaluated to have better mechanical strength, and materials with higher values of the tensile elongation are evaluated to have better toughness.

2. Heat Aging Resistance

ASTM No. 1 dumbbell-shaped test specimens for evaluation having a thickness of ⅛ inch (about 3.2 mm) were prepared by performing injection molding under the same conditions as described for the preparation of the test specimens for evaluating the mechanical properties in the section 1, using an injection molding machine, IS55EPN, manufactured by Toshiba Machine Co., Ltd. The obtained test specimens for evaluation were placed in a hot air oven under an atmospheric pressure at 190° C. and subjected to heat treatment for 500 hours. The maximum tensile strength point of the test specimens for evaluation after the heat treatment was measured under the same conditions as in the section 1. The mean of the measured values of the three test specimens was taken. The tensile strength retention was calculated according to the following equation, from the maximum tensile strength point of the test specimens for evaluation after the heat treatment, and from the maximum tensile strength point of the test specimens for evaluation before the heat treatment measured in the section 1. A higher tensile strength retention was evaluated to provide excellent heat aging resistance, and the tensile strength retention of 75% or more was evaluated to be particularly excellent.

Tensile strength retention (%)=(maximum tensile
strength point after heat treatment/maximum
tensile strength point before heat treatment)×
100

3. Hydrolysis Resistance (Tensile Strength Retention)

ASTM No. 1 dumbbell-shaped test specimens for evaluating the tensile properties having a test specimen thickness of ⅛ inch (about 3.2 mm) were prepared by performing injection molding under the same conditions as described for the preparation of the test specimens for evaluating the mechanical properties in the section 1, using an injection molding machine, IS55EPN, manufactured by Toshiba Machine Co., Ltd. The resulting ASTM No. 1 dumbbell-shaped specimens were placed in a highly accelerated stress test chamber, EHS-411 manufactured by ESPEC Corp., controlled at a temperature of 121° C. and a humidity of 100% RH, and subjected to pressurized heat-moisture treatment for 50 hours. The maximum tensile strength point of the molded articles after the heat-moisture treatment was measured under the same conditions as in the section 1. The mean of the measured values of the three test specimens was taken. The tensile strength retention was calculated according to the following equation, from the maximum tensile strength point of the test specimens for evaluation after the heat-moisture treatment, and from the maximum tensile strength point of the test specimens for evaluation before the heat-moisture treatment measured in the section 1. A higher tensile strength retention was evaluated to provide better hydrolysis resistance, and materials with a tensile strength retention of 90% or more was evaluated to be particularly excellent in hydrolysis resistance.

Tensile strength retention (%)=(maximum tensile
strength point after heat-moisture treatment/
maximum tensile strength point before heat-
moisture treatment)×100

4. Bleed-Out

ASTM No. 1 dumbbell-shaped test specimens for evaluating the bleed-out having a test specimen thickness of ⅛ inch (about 3.2 mm) were prepared by performing injection molding under the same conditions as described for the preparation of the test specimens for evaluating the mechanical properties in the section 1, using an injection molding machine, IS55EPN, manufactured by Toshiba Machine Co., Ltd. The obtained ASTM No. 1 dumbbell-shaped test specimens were placed in a hot air oven under an atmospheric pressure at 170° C. and subjected to heat-dry treatment for 1000 hours. In addition, ASTM No. 1 dumbbell-shaped specimens obtained similarly were placed in a highly accelerated stress test chamber, EHS-411 manufactured by ESPEC Corp., controlled at a temperature of 121° C. and a humidity of 100% RH, and subjected to heat-moisture treatment for 50 hours. The appearance of the molded articles after the heat-dry treatment and the heat-moisture treatment was visually observed, and the evaluation of bleed-out was performed according to the following standards.

A: No bleed-out of liquid or white powder is observed on any of the molded articles.

B: Bleed-out of liquid or white powder is observed in some or many portions of the molded article.

Examples 1 to 55 and Comparative Examples 1 to 20

A co-rotating twin-screw extruder equipped with a vent (TEX-30a, manufactured by The Japan Steel Works, Ltd.) with a screw diameter of 30 mm and a L/D of 35 was used. In each of the Examples and Comparative Examples, the thermoplastic polyester resin (A), the epoxy compound (B), the hydroxy group-containing resin (C), and other materials as required were mixed according to the compositions shown in Tables 1 to 9, and the resulting mixture was fed to the twin-screw extruder through its feeding portion. The fiber reinforcement (E) was fed through a side feeder installed between the feeding portion and the vent portion. Melt blending was performed under the extrusion conditions of a kneading temperature of 250° C. and a screw rotational speed of 200 rpm. The melt-blended resin was extruded in the form of strands and passed through a cooling bath, and the resulting strands were then cut into pellets using a strand cutter.

The resulting pellets were dried in a hot air dryer controlled at a temperature of 110° C. for 12 hours. After the drying, the dried pellets were molded and evaluated according to the above-mentioned methods. The results are shown in Tables 1 to 9. In Tables 1 to 9, the hydroxy group concentration (eq/kg) of the hydroxy group-containing resin in the thermoplastic polyester resin composition means the hydroxy group equivalent (eq) derived from the hydroxy group-containing resin in 1 kg of the thermoplastic polyester resin composition.

TABLE 1

|  |  |  | Example 1 | Example 2 | Example 3 | Example 4 | Example 5 | Example 6 |
|---|---|---|---|---|---|---|---|---|
| Thermoplastic polyester resin (A) | A-1 | Parts by weight | 95.5 | 94 | 94 | 91 | 94 | |
|  | A-2 |  |  |  |  |  |  | 94 |
| Epoxy compound (B) | B-1 | Parts by weight | 0.7 | 0.7 | 0.7 | 0.7 | 0.7 | 0.7 |
|  | B-2 |  |  |  |  |  |  |  |
|  | B-3 |  |  |  |  |  |  |  |
| Hydroxy group-containing resin (C) | C-1 | Parts by weight | 4.5 | 6 | 6 | 9 |  |  |
|  | C-2 |  |  |  |  |  | 6 | 6 |
|  | C-3 |  |  |  |  |  |  |  |
|  | C-4 |  |  |  |  |  |  |  |
| Fiber reinforcement (E) | E-1 | Parts by weight | 43 | 43 |  | 43 | 43 | 43 |
|  | E-2 |  |  |  | 43 |  |  |  |
| Hydroxy group concentration of hydroxy group-containing resin in thermoplastic polyester resin composition |  | eq/kg | 18 | 24 | 24 | 36 | 24 | 24 |
| Mechanical properties | Tensile strength | MPA | 150 | 151 | 148 | 151 | 150 | 145 |
|  | Tensile elongation | % | 3.5 | 3.5 | 3.5 | 3.5 | 3.5 | 3.4 |
| Heat aging resistance | Tensile strength retention | % | 103 | 100 | 96 | 97 | 101 | 105 |

TABLE 1-continued

|  |  |  |  |  |  |  |  |
|---|---|---|---|---|---|---|---|
| 190° C. × 500 hours | Bleed-out property |  | A | A | A | A | A | A |
| Hydrolysis resistance 121° C./ | Tensile strength retention | % | 92 | 94 | 92 | 95 | 93 | 92 |
| 100% RH × 50 hours | Bleed-out property |  | A | A | A | A | A | A |

|  |  |  |  | Example 7 | Example 8 | Example 9 | Example 10 |
|---|---|---|---|---|---|---|---|
| Thermoplastic polyester resin (A) | A-1 | | Parts by weight | 91 | 95.5 | 95.5 | 98 |
|  | A-2 | | | | | | |
| Epoxy compound (B) | B-1 | | Parts by weight | 0.7 | 0.7 | 0.7 | 0.7 |
|  | B-2 | | | | | | |
|  | B-3 | | | | | | |
| Hydroxy group-containing resin (C) | C-1 | | Parts by weight | | | | |
|  | C-2 | | | 9 | | | |
|  | C-3 | | | | 4.5 | 4.5 | |
|  | C-4 | | | | | | 2 |
| Fiber reinforcement (E) | E-1 | | Parts by weight | 43 | 43 | | 43 |
|  | E-2 | | | | | 43 | |
| Hydroxy group concentration of hydroxy group-containing resin in thermoplastic polyester resin composition | | | eq/kg | 36 | 36 | 36 | 36 |
| Mechanical properties | Tensile strength | MPA | | 149 | 148 | 147 | 147 |
|  | Tensile elongation | % | | 3.6 | 3.5 | 3.5 | 3.7 |
| Heat aging resistance | Tensile strength retention | % | | 96 | 105 | 100 | 97 |
| 190° C. × 500 hours | Bleed-out property | | | A | A | A | A |
| Hydrolysis resistance 121° C./ | Tensile strength retention | % | | 92 | 92 | 91 | 92 |
| 100% RH × 50 hours | Bleed-out property | | | A | A | A | A |

TABLE 2

|  |  |  | Example 11 | Example 12 | Example 13 | Example 14 | Example 15 | Example 16 |
|---|---|---|---|---|---|---|---|---|
| Thermoplastic polyester resin (A) | A-1 | Parts by weight | 94 | 94 | 91 | 94 | 91 | |
|  | A-2 | | | | | | | 91 |
| Epoxy compound (B) | B-1 | Parts by weight | 1.0 | 1.0 | 1.0 | 1.0 | 1.0 | 1.0 |
|  | B-2 | | 1.5 | 1.5 | 1.5 | 1.5 | 1.5 | 1.5 |
|  | B-3 | | | | | | | |
| Hydroxy group-containing resin (C) | C-1 | Parts by weight | 6 | 6 | 9 | | | |
|  | C-2 | | | | | 6 | 9 | 9 |
|  | C-3 | | | | | | | |
|  | C-4 | | | | | | | |
| Fiber reinforcement (E) | E-1 | Parts by weight | 43 | | 43 | 43 | 43 | 43 |
|  | E-2 | | | 43 | | | | |
| Hydroxy group concentration of hydroxy group-containing resin in thermoplastic polyester resin composition | | eq/kg | 24 | 24 | 36 | 24 | 36 | 36 |
| Mechanical properties | Tensile strength | MPA | 150 | 149 | 152 | 148 | 149 | 146 |
|  | Tensile elongation | % | 3.5 | 3.6 | 3.5 | 3.5 | 3.5 | 3.4 |
| Heat aging resistance | Tensile strength retention | % | 100 | 98 | 95 | 100 | 102 | 105 |
| 190° C. × 500 hours | Bleed-out property | | A | A | A | A | A | A |
| Hydrolysis resistance 121° C./ | Tensile strength retention | % | 97 | 97 | 98 | 96 | 97 | 95 |
| 100% RH × 50 hours | Bleed-out property | | A | A | A | A | A | A |

|  |  |  | Example 17 | Example 18 | Example 19 | Example 20 |
|---|---|---|---|---|---|---|
| Thermoplastic polyester resin (A) | A-1 | Parts by weight | 97 | 95.5 | 95.5 | 98 |
|  | A-2 | | | | | |
| Epoxy compound (B) | B-1 | Parts by weight | 1.0 | 1.0 | 1.0 | 1.0 |
|  | B-2 | | 1.5 | 1.5 | 1.5 | 1.5 |
|  | B-3 | | | | | |
| Hydroxy group-containing resin (C) | C-1 | Parts by weight | | | | |
|  | C-2 | | | | | |
|  | C-3 | | 3 | 4.5 | 4.5 | |
|  | C-4 | | | | | 2 |

TABLE 2-continued

| | | | | | | |
|---|---|---|---|---|---|---|
| Fiber reinforcement (E) | E-1 | Parts by weight | 43 | 43 | | 43 |
| | E-2 | | | | 43 | |
| Hydroxy group concentration of hydroxy group-containing resin in thermoplastic polyester resin composition | | eq/kg | 24 | 36 | 36 | 36 |
| Mechanical properties | Tensile strength | MPA | 141 | 140 | 139 | 138 |
| | Tensile elongation | % | 3.3 | 3.2 | 3.3 | 3.6 |
| Heat aging resistance 190° C. × 500 hours | Tensile strength retention | % | 104 | 105 | 100 | 95 |
| | Bleed-out property | | A | A | A | A |
| Hydrolysis resistance 121° C./ 100% RH × 50 hours | Tensile strength retention | % | 97 | 98 | 97 | 97 |
| | Bleed-out property | | A | A | A | A |

TABLE 3

| | | | Example 21 | Example 22 | Example 23 | Example 24 | Example 25 |
|---|---|---|---|---|---|---|---|
| Thermoplastic polyester resin (A) | A-1 | Parts by weight | 94 | 94 | 95.5 | 94 | 91 |
| | A-2 | | | | | | |
| Epoxy compound (B) | B-1 | Parts by weight | | | | 0.7 | 0.7 |
| | B-2 | | 1.5 | 1.5 | 1.5 | | |
| | B-3 | | 0.7 | 0.7 | 0.7 | | |
| Hydroxy group-containing resin (C) | C-1 | Parts by weight | 6 | | | 6 | 9 |
| | C-2 | | | 6 | | | |
| | C-3 | | | | 4.5 | | |
| | C-4 | | | | | | |
| Fiber reinforcement (E) | E-1 | Parts by weight | 43 | 43 | 43 | | |
| | E-2 | | | | | | |
| Hydroxy group concentration of hydroxy group-containing resin in thermoplastic polyester resin composition | | eq/kg | 24 | 24 | 36 | 24 | 36 |
| Mechanical properties | Tensile strength | MPA | 140 | 138 | 130 | 60 | 59 |
| | Tensile elongation | % | 3.5 | 3.5 | 3.5 | 6.3 | 6.1 |
| Heat aging resistance 190° C. × 500 hours | Tensile strength retention | % | 92 | 93 | 95 | 82 | 85 |
| | Bleed-out property | | A | A | A | A | A |
| Hydrolysis resistance 121° C./ 100% RH × 50 hours | Tensile strength retention | % | 100 | 95 | 97 | 94 | 95 |
| | Bleed-out property | | A | A | A | A | A |

| | | | Example 26 | Example 27 | Example 28 | Example 29 |
|---|---|---|---|---|---|---|
| Thermoplastic polyester resin (A) | A-1 | Parts by weight | 99.6 | 99.2 | 98.8 | 91 |
| | A-2 | | | | | |
| Epoxy compound (B) | B-1 | Parts by weight | 0.7 | 0.7 | 0.7 | 0.7 |
| | B-2 | | | | | |
| | B-3 | | | | | |
| Hydroxy group-containing resin (C) | C-1 | Parts by weight | | | | 9 |
| | C-2 | | 0.4 | 0.8 | 1.2 | |
| | C-3 | | | | | |
| | C-4 | | | | | |
| Fiber reinforcement (E) | E-1 | Parts by weight | | | | |
| | E-2 | | | | | |
| Hydroxy group concentration of hydroxy group-containing resin in thermoplastic polyester resin composition | | eq/kg | 1.6 | 3.2 | 4.8 | 36 |
| Mechanical properties | Tensile strength | MPA | 60 | 60 | 60 | 59 |
| | Tensile elongation | % | 6.5 | 6.4 | 6.3 | 6.1 |
| Heat aging resistance 190° C. × 500 hours | Tensile strength retention | % | 75 | 77 | 78 | 80 |
| | Bleed-out property | | A | A | A | A |
| Hydrolysis resistance 121° C./ 100% RH × 50 hours | Tensile strength retention | % | 90 | 94 | 94 | 93 |
| | Bleed-out property | | A | A | A | A |

TABLE 4

| | | | Example 30 | Example 31 | Example 32 | Example 33 | Example 34 |
|---|---|---|---|---|---|---|---|
| Thermoplastic polyester resin (A) | A-1 | Parts by weight | | 75 | 95.5 | 98 | 94 |
| | A-2 | | 91 | | | | |
| Epoxy | B-1 | Parts by | 0.7 | 0.7 | 0.7 | 0.7 | 1.0 |

TABLE 4-continued

| | | | | | | | |
|---|---|---|---|---|---|---|---|
| compound (B) | B-2 | weight | | | | | 1.5 |
| | B-3 | | | | | | |
| Hydroxy group- | C-1 | Parts by | | | | | 6 |
| containing resin (C) | C-2 | weight | 9 | 25 | | | |
| | C-3 | | | | 4.5 | | |
| | C-4 | | | | | 2 | |
| Fiber | E-1 | Parts by | | | | | |
| reinforcement (E) | E-2 | weight | | | | | |
| Hydroxy group concentration of hydroxy group-containing resin in thermoplastic polyester resin composition | | eq/kg | 36 | 90 | 36 | 36 | 24 |
| Mechanical | Tensile strength | MPA | 56 | 55 | 57 | 58 | 60 |
| properties | Tensile elongation | % | 6.1 | 6.1 | 5.7 | 5.9 | 6.7 |
| Heat aging resistance | Tensile strength retention | % | 85 | 80 | 78 | 77 | 90 |
| 190° C. × 500 hours | Bleed-out property | | A | A | A | A | A |
| Hydrolysis resistance 121° C./ | Tensile strength retention | % | 92 | 91 | 92 | 93 | 98 |
| 100% RH × 50 hours | Bleed-out property | | A | A | A | A | A |

| | | | Example 35 | Example 36 | Example 37 | Example 38 |
|---|---|---|---|---|---|---|
| Thermoplastic | A-1 | Parts by | 94 | | 95.5 | 98 |
| polyester resin (A) | A-2 | weight | | 94 | | |
| Epoxy | B-1 | Parts by | 1.0 | 1.0 | 1.0 | 1.0 |
| compound (B) | B-2 | weight | 1.5 | 1.5 | 1.5 | 1.5 |
| | B-3 | | | | | |
| Hydroxy group- | C-1 | Parts by | | | | |
| containing resin (C) | C-2 | weight | 6 | 6 | | |
| | C-3 | | | | 4.5 | |
| | C-4 | | | | | 2 |
| Fiber | E-1 | Parts by | | | | |
| reinforcement (E) | E-2 | weight | | | | |
| Hydroxy group concentration of hydroxy group-containing resin in thermoplastic polyester resin composition | | eq/kg | 24 | 24 | 36 | 36 |
| Mechanical | Tensile strength | MPA | 60 | 57 | 58 | 59 |
| properties | Tensile elongation | % | 6.5 | 6.5 | 6.0 | 6.0 |
| Heat aging resistance | Tensile strength retention | % | 88 | 92 | 92 | 86 |
| 190° C. × 500 hours | Bleed-out property | | A | A | A | A |
| Hydrolysis resistance 121° C./ | Tensile strength retention | % | 97 | 95 | 100 | 97 |
| 100% RH × 50 hours | Bleed-out property | | A | A | A | A |

TABLE 5

| | | | Example 39 | Example 40 | Example 41 | Example 42 | Example 43 | Example 44 |
|---|---|---|---|---|---|---|---|---|
| Thermoplastic | A-1 | Parts by | 97 | 94 | 95.5 | 97 | 94 | 95.5 |
| polyester resin (A) | A-2 | weight | | | | | | |
| Epoxy | B-1 | Parts by | | | | | | |
| compound (B) | B-2 | weight | | | | 1.5 | 1.5 | 1.5 |
| | B-3 | | | | | | | |
| | B-4 | | 0.3 | 0.3 | 0.3 | 0.3 | 0.3 | 0.3 |
| Hydroxy group- | C-1 | Parts by | 3 | 6 | | 3 | 6 | |
| containing resin (C) | C-2 | weight | | | | | | |
| | C-3 | | | | 4.5 | | | 4.5 |
| | C-4 | | | | | | | |
| Fiber | E-1 | Parts by | 43 | 43 | 43 | 43 | 43 | 43 |
| reinforcement (E) | E-2 | weight | | | | | | |
| Hydroxy group concentration of hydroxy group-contain ingresin in thermoplastic polyester resin composition | | eq/kg | 12 | 24 | 36 | 12 | 24 | 36 |
| Mechanical | Tensile strength | MPA | 148 | 149 | 148 | 140 | 142 | 132 |
| properties | Tensile elongation | % | 4.4 | 4.6 | 4.8 | 4.2 | 4.5 | 4.5 |
| Heat aging resistance | Tensile strength retention | % | 97 | 96 | 105 | 102 | 96 | 99 |
| 190° C. × 500 hours | Bleed-out property | | A | A | A | A | A | A |
| Hydrolysis resistance 121° C./ | Tensile strength retention | % | 95 | 98 | 97 | 97 | 98 | 96 |
| 100% RH × 50 hours | Bleed-out property | | A | A | A | A | A | A |

TABLE 6

|  |  |  | Example 45 | Example 46 | Example 47 | Example 48 | Example 49 |
|---|---|---|---|---|---|---|---|
| Thermoplastic polyester resin (A) | A-1 | Parts by weight | 97 | 94 | 91 | 95.5 | 98.5 |
|  | A-2 |  |  |  |  |  |  |
| Epoxy compound (B) | B-1 | Parts by weight |  |  |  |  |  |
|  | B-2 |  |  |  |  |  | 1.5 |
|  | B-3 |  |  |  |  |  |  |
|  | B-4 |  |  | 0.3 | 0.3 | 0.3 | 0.3 | 0.3 |
| Hydroxy group-containing resin (C) | C-1 | Parts by weight | 3 | 6 | 9 |  | 1.5 |
|  | C-2 |  |  |  |  |  |  |
|  | C-3 |  |  |  |  | 4.5 |  |
|  | C-4 |  |  |  |  |  |  |
| Fiber reinforcement (E) | E-1 | Parts by weight |  |  |  |  |  |
|  | E-2 |  |  |  |  |  |  |
| Hydroxy group concentration of hydroxy group-containing resin in thermoplastic polyester resin composition |  | eq/kg | 12 | 24 | 36 | 36 | 6 |
| Mechanical properties | Tensile strength | MPA | 58 | 60 | 61 | 62 | 58 |
|  | Tensile elongation | % | 6.4 | 6.8 | 6.6 | 5.8 | 6.0 |
| Heat aging resistance 190° C. × 500 hours | Tensile strength retention | % | 81 | 85 | 86 | 82 | 86 |
|  | Bleed-out property |  | A | A | A | A | A |
| Hydrolysis resistance 121° C./ 100% RH × 50 hours | Tensile strength retention | % | 93 | 96 | 97 | 94 | 103 |
|  | Bleed-out property |  | A | A | A | A | A |

|  |  |  | Example 50 | Example 51 | Example 52 |
|---|---|---|---|---|---|
| Thermoplastic polyester resin (A) | A-1 | Parts by weight | 97 | 94 | 95.5 |
|  | A-2 |  |  |  |  |
| Epoxy compound (B) | B-1 | Parts by weight |  |  |  |
|  | B-2 |  | 1.5 | 1.5 | 1.5 |
|  | B-3 |  |  |  |  |
|  | B-4 |  | 0.3 | 0.3 | 0.3 |
| Hydroxy group-containing resin (C) | C-1 | Parts by weight | 3 | 6 |  |
|  | C-2 |  |  |  |  |
|  | C-3 |  |  |  | 4.5 |
|  | C-4 |  |  |  |  |
| Fiber reinforcement (E) | E-1 | Parts by weight |  |  |  |
|  | E-2 |  |  |  |  |
| Hydroxy group concentration of hydroxy group-containing resin in thermoplastic polyester resin composition |  | eq/kg | 12 | 24 | 36 |
| Mechanical properties | Tensile strength | MPA | 59 | 59 | 62 |
|  | Tensile elongation | % | 6.3 | 6.3 | 6.0 |
| Heat aging resistance 190° C. × 500 hours | Tensile strength retention | % | 88 | 88 | 87 |
|  | Bleed-out property |  | A | A | A |
| Hydrolysis resistance 121° C./ 100% RH × 50 hours | Tensile strength retention | % | 101 | 101 | 97 |
|  | Bleed-out property |  | A | A | A |

45

TABLE 7

|  |  |  | Example 53 | Example 54 | Example 55 |
|---|---|---|---|---|---|
| Thermoplastic polyester resin (A) | A-1 | Parts by weight | 98.8 | 98.8 | 98.8 |
|  | A-2 |  |  |  |  |
| Epoxy compound (B) | B-1 | Parts by weight | 0.7 | 0.7 | 0.7 |
|  | B-2 |  |  |  |  |
|  | B-3 |  |  |  |  |
|  | B'-5 |  |  |  |  |
| Hydroxy group-containing resin (C) | C-1 | Parts by weight | 1.2 | 1.2 | 1.2 |
| Phosphorus compound (D) | D-1 | Parts by weight | 0.1 | 0.2 | 0.3 |
| Fiber reinforcement (E) | E-1 | Parts by weight |  |  |  |
| Hydroxy group concentration of hydroxy group-containing resin in thermoplastic polyester resin composition |  | eq/kg | 4.8 | 4.8 | 4.8 |
| Mechanical properties | Tensile strength | MPA | 60 | 60 | 60 |
|  | Tensile elongation | % | 6.3 | 6.4 | 6.3 |
| Heat aging resistance | Tensile strength retention | % | 84 | 94 | 88 |

TABLE 7-continued

|  |  |  | Example 53 | Example 54 | Example 55 |
|---|---|---|---|---|---|
| 190° C. × 500 hours | Bleed-out property |  | A | A | A |
| Hydrolysis resistance 121° C./ | Tensile strength retention | % | 94 | 94 | 94 |
| 100% RH × 50 hours | Bleed-out property |  | A | A | A |

TABLE 8

|  |  |  | Comparative Example 1 | Comparative Example 2 | Comparative Example 3 | Comparative Example 4 | Comparative Example 5 |
|---|---|---|---|---|---|---|---|
| Thermoplastic polyester resin (A) | A-1 | Parts by weight | 100 | 100 | 99 | 86.5 | 94 |
|  | A-2 |  |  |  |  |  |  |
| Epoxy compound (B) | B-1 | Parts by weight |  | 0.7 | 0.7 | 0.7 |  |
|  | B-2 |  |  |  |  |  |  |
|  | B-3 |  |  |  |  |  |  |
|  | B'-5 |  |  |  |  |  |  |
| Hydroxy group-containing resin (C) | C-2 | Parts by weight |  |  |  |  | 6 |
| Hydroxy group-containing resin (C') | C'-1 |  |  |  |  | 1.0 |  |
|  | C'-2 |  |  |  |  | 13.5 |  |
| Fiber reinforcement (E) | E-1 | Parts by weight | 43 | 43 | 43 | 43 | 43 |
|  | E-2 |  |  |  |  |  |  |
| Hydroxy group concentration of hydroxy group-containing resin in thermoplastic polyester resin composition |  | eq/kg | 0 | 1 | 24 | 24 | 24 |
| Mechanical properties | Tensile strength | MPA | 135 | 141 | 140 | 140 | 145 |
|  | Tensile elongation | % | 3.3 | 3.6 | 3.5 | 3.5 | 3.6 |
| Heat aging resistance 190° C. × 500 hours | Tensile strength retention | % | 70 | 73 | 80 | 75 | 78 |
|  | Bleed-out property |  | A | A | B | A | A |
| Hydrolysis resistance 121° C./ 100% RH × 50 hours | Tensile strength retention | % | 45 | 76 | 60 | 75 | 70 |
|  | Bleed-out property |  | A | A | B | B | A |

|  |  |  | Comparative Example 6 | Comparative Example 7 | Comparative Example 8 | Comparative Example 9 |
|---|---|---|---|---|---|---|
| Thermoplastic polyester resin (A) | A-1 | Parts by weight | 94 |  | 100 | 67 |
|  | A-2 |  |  | 94 |  |  |
| Epoxy compound (B) | B-1 | Parts by weight |  |  | 0.7 | 0.7 |
|  | B-2 |  |  |  |  |  |
|  | B-3 |  |  |  |  |  |
|  | B'-5 |  | 1.0 | 1.0 |  |  |
| Hydroxy group-containing resin (C) | C-2 | Parts by weight | 6 | 6 | 0.05 | 33 |
| Hydroxy group-containing resin (C') | C'-1 |  |  |  |  |  |
|  | C'-2 |  |  |  |  |  |
| Fiber reinforcement (E) | E-1 | Parts by weight | 43 | 43 |  |  |
|  | E-2 |  |  |  |  |  |
| Hydroxy group concentration of hydroxy group-containing resin in thermoplastic polyester resin composition |  | eq/kg | 24 | 24 | 0.4 | 120 |
| Mechanical properties | Tensile strength | MPA | 145 | 135 | 60 | 50 |
|  | Tensile elongation | % | 3.7 | 2.5 | 6.7 | 6.0 |
| Heat aging resistance 190° C. × 500 hours | Tensile strength retention | % | 82 | 85 | 60 | 70 |
|  | Bleed-out property |  | A | A | A | A |
| Hydrolysis resistance 121° C./ 100% RH × 50 hours | Tensile strength retention | % | 75 | 55 | 68 | 85 |
|  | Bleed-out property |  | A | A | A | A |

TABLE 9

|  |  |  | Comparative Example 10 | Comparative Example 11 | Comparative Example 12 | Comparative Example 13 | Comparative Example 14 |
|---|---|---|---|---|---|---|---|
| Thermoplastic polyester resin (A) | A-1 | Parts by weight | 100 | 100 | 94 | 91 | 100 |
|  | A-2 |  |  |  |  |  |  |
| Epoxy | B-1 | Parts by | 1.0 |  |  |  |  |

TABLE 9-continued

| compound (B) | B-2 | weight | 1.5 | | | | |
|---|---|---|---|---|---|---|---|
| | B-3 | | | | | | |
| | B-4 | | | 0.3 | | | 0.3 |
| Hydroxy group-containing resin (C) | C-1 | Parts by weight | | | 6 | 9 | |
| Hydroxy group-containing resin (C') | C'-1 | | | | | | |
| | C'-2 | | | | | | |
| Fiber reinforcement (E) | E-1 | Parts by weight | | 43 | 43 | 43 | |
| | E-2 | | | | | | |
| Hydroxy group concentration of hydroxy group-containing resin in thermoplastic polyester resin composition | | eq/kg | 2 | 0 | 24 | 36 | 0 |
| Mechanical properties | Tensile strength | MPA | 60 | 142 | 146 | 141 | 60 |
| | Tensile elongation | % | 6.5 | 3.5 | 3.5 | 3.6 | 6.5 |
| Heat aging resistance 190° C. × 500 hours | Tensile strength retention | % | 72 | 72 | 77 | 75 | 45 |
| | Bleed-out property | | A | A | A | A | A |
| Hydrolysis resistance 121° C./ 100% RH × 50 hours | Tensile strength retention | % | 95 | 71 | 75 | 80 | 55 |
| | Bleed-out property | | A | A | A | A | A |

| | | | | Comparative Example 15 | Comparative Example 16 | Comparative Example 17 | Comparative Example 18 |
|---|---|---|---|---|---|---|---|
| Thermoplastic polyester resin (A) | A-1 | | Parts by weight | 100 | 98.5 | 97 | 94 |
| | A-2 | | | | | | |
| Epoxy compound (B) | B-1 | | Parts by weight | | | | |
| | B-2 | | | 1.5 | | | |
| | B-3 | | | | | | |
| | B-4 | | | 0.3 | | | |
| Hydroxy group-containing resin (C) | C-1 | | Parts by weight | | 1.5 | 3 | 6 |
| Hydroxy group-containing resin (C') | C'-1 | | | | | | |
| | C'-2 | | | | | | |
| Fiber reinforcement (E) | E-1 | | Parts by weight | | | | |
| | E-2 | | | | | | |
| Hydroxy group concentration of hydroxy group-containing resin in thermoplastic polyester resin composition | | | eq/kg | 0 | 6 | 12 | 24 |
| Mechanical properties | Tensile strength | | MPA | 60 | 61 | 60 | 58 |
| | Tensile elongation | | % | 6.2 | 6.5 | 6.6 | 6.8 |
| Heat aging resistance 190° C. × 500 hours | Tensile strength retention | | % | 65 | 60 | 65 | 70 |
| | Bleed-out property | | | A | A | A | A |
| Hydrolysis resistance 121° C./ 100% RH × 50 hours | Tensile strength retention | | % | 85 | 68 | 70 | 72 |
| | Bleed-out property | | | A | A | A | A |

The comparison between Examples 1 to 5, 7 to 10 and Comparative Examples 1, 2 and 5, the comparison between Examples 34, 35, 37 and 38 and Comparative Example 10, the comparison between Examples 39 to 44 and Comparative Example 11, the comparison between Examples 2, 11, 21, 40 and 43 and Comparative Examples 12 and 13, the comparison between Examples 45 to 52 and Comparative Example 14, the comparison between Examples 42 to 44 and 49 to 52 and Comparative Example 15, and the comparison between Example 45 to 48 and Comparative Examples 16 to 18 show that, when the epoxy compound (B) and the hydroxy group-containing resin (C) were blended in a specific range with respect to the thermoplastic polyester resin (A), the bleed-out property was improved while maintaining the mechanical properties, and the heat aging resistance was also improved without decreasing the hydrolysis resistance. As a result, materials that achieve both of the heat aging resistance and the hydrolysis resistance at a high level can be obtained.

The comparison between Examples 1 to 5 and 7 to 10 and Comparative Example 3 shows that, when the hydroxy group-containing resin (C) having a specific number average molecular weight was blended in a specific range, the bleed-out property was improved while maintaining the mechanical properties, and the heat aging resistance was also improved without decreasing the hydrolysis resistance, compared to when the hydroxy group-containing compound (C') having a number average molecular weight outside the specific range was blended. As a result, materials that achieve both of the heat aging resistance and the hydrolysis resistance at a high level can be obtained.

The comparison between Examples 2, 5 and 7 and Comparative Example 4 shows that, when the hydroxy group-containing resin (C) having a halogen element content of 1,000 ppm or less was blended in a specific range, the bleed-out was suppressed and the heat aging resistance was improved without deteriorating the mechanical properties and the hydrolysis resistance, compared to when the hydroxy group-containing resin (C') having a halogen element content of more than 1,000 ppm was blended. As a result, materials that achieve both of the heat aging resistance and the hydrolysis resistance at a high level can be obtained.

The comparison between Examples 5, 14, and 22 and Comparative Example 6 shows that, when the epoxy compound (B) having an epoxy equivalent of 200 to 3,000 g/eq was blended in a specific range, the hydrolysis resistance was improved without deteriorating the mechanical properties and the heat aging resistance improved by the effect of the hydroxy group-containing resin (C), compared to when the epoxy compound (B') having an epoxy equivalent of less than 200 g/eq was blended. As a result, materials achieving both of the heat aging resistance and the hydrolysis resistance were obtained.

The comparison between Example 6 and Comparative Example 7 shows that, by using the epoxy compound (B) and the hydroxy group-containing resin (C) in a preferred composition, the hydrolysis resistance and the heat aging resistance were improved not only in PBT but also in PET.

The comparison between Examples 26 to 29, 31 and Comparative Examples 8 and 9 shows that, when the thermoplastic polyester resin (A) and the hydroxy group-containing resin (C) were blended in a specific range, the heat aging resistance and the hydrolysis resistance were improved while maintaining the mechanical properties, resulting in a material which achieves both of the heat aging resistance and the hydrolysis resistance.

The comparison between Examples 53 to 55 and Example 28 shows that the addition of a phosphorus compound (D) further improved the heat aging resistance without decreasing the hydrolysis resistance, resulting in a material achieving both of the heat aging resistance and the hydrolysis resistance.

The invention claimed is:

1. A thermoplastic polyester resin composition comprising a thermoplastic polyester resin (A), an epoxy compound (B) having an epoxy equivalent of from 200 to 3,000 g/eq, and a hydroxy group-containing resin (C) having a number average molecular weight of from 2,000 to 10,000 and a halogen element content of 1,000 ppm or less,
wherein the hydroxy group-containing resin (C) is a phenoxy resin and/or an acrylic resin containing hydroxyalkyl (meth)acrylate as a structural unit,
the epoxy compound (B) is blended in an amount of 0.05 to 10 parts by weight with respect to 100 parts by weight in total of the thermoplastic polyester resin (A) and the hydroxy group-containing resin (C), and
a blending amount of the hydroxy group-containing resin (C) is 0.1 to 4.5 parts by weight with respect to 100 parts by weight in total of the thermoplastic polyester resin (A) and the hydroxy group-containing resin (C).

2. The thermoplastic polyester resin composition according to claim 1, wherein the thermoplastic polyester resin (A) has a melting point higher than 200° C.

3. The polyester resin composition according to claim 1, wherein the thermoplastic polyester resin (A) is a resin selected from polybutylene terephthalate, polypropylene terephthalate, and polybutylene naphthalate.

4. The thermoplastic polyester resin composition according to claim 1, wherein the thermoplastic polyester resin (A) is a polybutylene terephthalate.

5. The thermoplastic polyester resin composition according to claim 1, wherein the epoxy compound (B) includes an epoxy compound having two or more epoxy groups in one molecule.

6. The thermoplastic polyester resin composition according to claim 1, wherein the hydroxy group-containing resin (C) has a hydroxy group value of 3 to 20 eq/kg.

7. The thermoplastic polyester resin composition according to claim 1, further comprising a phosphorus compound (D) represented by general formula (1) in an amount of 0.01 to 1 part by weight with respect to 100 parts by weight in total of the thermoplastic polyester resin (A) and the hydroxy group-containing resin (C):

wherein, in formula (1), $R^1$ and $R^2$ are independently selected from hydrogen (except when $R^1$ and $R^2$ are both hydrogen), OM (wherein O is a negatively charged oxygen atom, and M is a positively charged counter ion), an alkyl group having from 1 to 20 carbon atoms, an alkylene group having from 2 to 20 carbon atoms, an aryl group having from 6 to 20 carbon atoms, an alkyloxy group having from 1 to 20 carbon atoms, a polyoxyalkylene group consisting of alkylene having from 2 to 4 carbon atoms, and an aryloxy group having from 6 to 20 carbon atoms; the alkyl group, alkylene group, aryl group, alkyloxy group, polyoxyalkylene group, and aryloxy group may be substituted with a substituent selected from an OH group, a halogen, a COOH group, or a $COOR^3$ group (wherein $R^3$ is an alkyl group having from 1 to 4 carbon atoms) and an NH2 group; in the case of substitution, the number of substitutions is 1 or 2; and $R^1$ and $R^2$ may be linked.

8. The thermoplastic polyester resin composition according to claim 7, wherein the phosphorus compound (D) represented by general formula (1) is a metal salt of phosphonic acid or a metal salt of phosphinic acid.

9. The thermoplastic polyester resin composition according to claim 1, further comprising a fiber reinforcement (E) in an amount of 1 to 100 parts by weight with respect to 100 parts by weight in total of the thermoplastic polyester resin (A) and the hydroxy group-containing resin (C).

10. The thermoplastic polyester resin composition according to claim 1, wherein the tensile strength retention after a ⅛ inch test piece molded in accordance with ASTM D638 (2005) is exposed to an atmosphere at a temperature of 190° C. for 500 hours, as calculated by the equation: tensile strength retention (%)=(tensile strength after exposure/tensile strength before exposure)×100, is 75% or more, and the tensile strength retention after a ⅛ inch test piece molded according to ASTM D638 (2005) is exposed to an atmosphere with a relative humidity of 100% and at a temperature of 121° C. for 50 hours, as calculated by the equation: tensile strength retention (%)=(tensile strength after exposure/tensile strength before exposure)×100, is 90% or more.

11. A molded article obtained by melt-molding the thermoplastic polyester resin composition according to claim 1.

* * * * *